(12) United States Patent
Johnson et al.

(10) Patent No.: US 11,490,558 B2
(45) Date of Patent: Nov. 8, 2022

(54) PARTICLE DELIVERY SYSTEM OF AN AGRICULTURAL ROW UNIT

(71) Applicant: CNH Industrial America LLC, New Holland, PA (US)

(72) Inventors: Chad Michael Johnson, Arlington Heights, IL (US); Brian John Anderson, Yorkville, IL (US); Trevor Philip Stanhope, Oak Lawn, IL (US); Christopher Schoeny, Minooka, IL (US); Kregg Jerome Raducha, Oak Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 272 days.

(21) Appl. No.: 16/726,435

(22) Filed: Dec. 24, 2019

(65) Prior Publication Data

US 2021/0185893 A1 Jun. 24, 2021

(51) Int. Cl.
*A01C 7/10* (2006.01)
*A01C 7/12* (2006.01)
(Continued)

(52) U.S. Cl.
CPC .............. *A01C 7/102* (2013.01); *A01C 7/04* (2013.01); *A01C 7/128* (2013.01); *A01C 7/163* (2013.01)

(58) Field of Classification Search
CPC ........... A01C 7/102; A01C 7/04; A01C 7/128; A01C 7/10; A01C 7/08; A01C 7/00;
(Continued)

(56) References Cited

U.S. PATENT DOCUMENTS 222,042 A 11/1879 Haworth
285,413 A 9/1883 Johnson
(Continued)

FOREIGN PATENT DOCUMENTS

AU 2012201380 A1 3/2012
BR 122012026494 B1 4/2016
(Continued)

OTHER PUBLICATIONS

Precision Planting, PrecisionMeter A Better Finger Meter, Improve Planter Performance Where it Counts—In the Meter, https://precisionplanting.com/products/product/precisionmeter, Feb. 14, 2019, 8 pages.
(Continued)

*Primary Examiner* — Christopher J. Novosad
(74) *Attorney, Agent, or Firm* — Rebecca Henkel; Rickard DeMille

(57) ABSTRACT

A particle delivery system of an agricultural row unit includes a shuttle track configured to be disposed adjacent to a particle metering and singulation unit, shuttles movably disposed along the shuttle track, and a track belt disposed inwardly of the shuttle track. Each shuttle is configured to receive a particle from the particle metering and singulation unit at a particle reception section of the shuttle track and release the particle toward a trench in soil at a particle deposition section of the shuttle track. The track belt includes paddles, and each paddle is configured to move a respective shuttle along a particle transfer section of the shuttle track from the particle reception section to the particle deposition section.

20 Claims, 12 Drawing Sheets

(51) Int. Cl.
*A01C 7/16* (2006.01)
*A01C 7/04* (2006.01)

(58) Field of Classification Search
CPC ........... A01C 7/127; A01C 7/12; A01C 7/163; A01C 7/16
See application file for complete search history.

(56) References Cited

U.S. PATENT DOCUMENTS

| | | | |
|---|---|---|---|
| 716,408 A | 12/1902 | Graham | |
| 2,646,191 A | 7/1953 | Wechsler | |
| 2,852,995 A | 9/1958 | Domries | |
| 3,176,636 A | 4/1965 | Wilcox et al. | |
| 3,343,507 A | 9/1967 | Smith | |
| 3,561,380 A | 2/1971 | Adams, Jr. et al. | |
| 3,627,050 A | 12/1971 | Hansen et al. | |
| 3,659,746 A | 5/1972 | Winslow | |
| 3,913,503 A | 10/1975 | Becker | |
| 4,023,509 A | 5/1977 | Hanson | |
| 4,026,437 A | 5/1977 | Biddle | |
| 4,029,235 A | 6/1977 | Grataloup | |
| 4,094,444 A | 6/1978 | Willis | |
| 4,600,122 A | 7/1986 | Lundie et al. | |
| 4,628,841 A | 12/1986 | Powilleit | |
| 4,928,607 A | 5/1990 | Luigi et al. | |
| 5,231,940 A | 8/1993 | Tjeerdsma | |
| 5,842,428 A | 12/1998 | Stufflebeam et al. | |
| 5,938,071 A | 8/1999 | Sauder | |
| 5,992,338 A * | 11/1999 | Romans | A01C 7/04 111/171 |
| 6,192,813 B1 | 2/2001 | Memory et al. | |
| 6,237,514 B1 | 5/2001 | Romans | |
| 6,269,758 B1 | 8/2001 | Sauder | |
| 6,283,051 B1 | 9/2001 | Yoss | |
| 6,332,413 B1 | 12/2001 | Stufflebeanm et al. | |
| 6,564,729 B1 | 5/2003 | Petzoldt | |
| 6,564,730 B2 | 5/2003 | Crabb et al. | |
| 6,581,535 B2 | 6/2003 | Barry et al. | |
| 6,615,754 B2 | 9/2003 | Unruh et al. | |
| 6,644,225 B2 | 11/2003 | Keaton et al. | |
| 6,681,706 B2 | 1/2004 | Sauder et al. | |
| 6,748,885 B2 | 6/2004 | Sauder et al. | |
| 6,752,095 B1 | 6/2004 | Rylander et al. | |
| 6,827,029 B1 | 12/2004 | Wendte et al. | |
| 6,863,006 B2 | 3/2005 | Sandoval et al. | |
| 7,162,963 B2 | 1/2007 | Sauder et al. | |
| 7,273,016 B2 | 9/2007 | Landphair et al. | |
| 7,334,532 B2 | 2/2008 | Sauder et al. | |
| 7,343,868 B2 | 3/2008 | Stephens et al. | |
| 7,377,221 B1 | 5/2008 | Brockmeier et al. | |
| 7,448,334 B2 | 11/2008 | Mariman et al. | |
| 7,490,565 B2 | 2/2009 | Holly | |
| 7,571,688 B1 | 8/2009 | Friestad et al. | |
| 7,617,785 B2 | 11/2009 | Wendte | |
| 7,631,606 B2 | 12/2009 | Sauder et al. | |
| 7,631,607 B2 | 12/2009 | Vandersnick | |
| 7,665,409 B2 | 2/2010 | Johnson | |
| 7,669,538 B2 | 3/2010 | Memory et al. | |
| 7,699,009 B2 | 4/2010 | Sauder et al. | |
| 7,717,048 B2 | 5/2010 | Peterson et al. | |
| 7,726,251 B1 | 6/2010 | Peterson et al. | |
| 7,735,438 B2 | 6/2010 | Riewerts et al. | |
| 7,775,167 B2 | 8/2010 | Stehling et al. | |
| 7,918,168 B2 | 4/2011 | Garner et al. | |
| 7,938,074 B2 | 5/2011 | Liu | |
| 8,074,586 B2 * | 12/2011 | Garner | A01C 7/105 111/171 |
| 8,078,367 B2 | 12/2011 | Sauder et al. | |
| 8,166,896 B2 | 5/2012 | Shoup | |
| 8,275,525 B2 | 9/2012 | Kowalchuk et al. | |
| 8,276,529 B2 | 10/2012 | Garner et al. | |
| 8,281,725 B2 | 10/2012 | Wendte et al. | |
| 8,297,210 B2 | 10/2012 | Spiesberger | |
| 8,365,679 B2 | 2/2013 | Landphair et al. | |
| 8,418,634 B2 | 4/2013 | Shoup | |
| 8,418,636 B2 | 4/2013 | Liu et al. | |
| 8,448,587 B2 | 5/2013 | Kowalchuk et al. | |
| 8,522,699 B2 | 9/2013 | Garner et al. | |
| 8,522,889 B2 | 9/2013 | Adams et al. | |
| 8,618,465 B2 | 12/2013 | Tevs et al. | |
| 8,671,856 B2 | 3/2014 | Garner et al. | |
| 8,677,914 B2 | 3/2014 | Stark | |
| 8,746,159 B2 | 6/2014 | Garner et al. | |
| 8,770,121 B2 | 7/2014 | Bragatto | |
| 8,813,663 B2 | 8/2014 | Garner et al. | |
| 8,825,310 B2 | 9/2014 | Kowalchuk | |
| 8,825,311 B2 | 9/2014 | Kowalchuk | |
| 8,843,281 B2 | 9/2014 | Wilhelmi et al. | |
| 8,850,995 B2 | 10/2014 | Garner et al. | |
| 8,850,997 B2 | 10/2014 | Silbernagel et al. | |
| 8,850,998 B2 | 10/2014 | Garner et al. | |
| 8,863,676 B2 | 10/2014 | Brockmann et al. | |
| 8,869,629 B2 | 10/2014 | Noble et al. | |
| 8,869,719 B2 | 10/2014 | Garner et al. | |
| 8,893,630 B2 | 11/2014 | Kowalchuk et al. | |
| 8,910,582 B2 | 12/2014 | Mariman et al. | |
| 8,925,471 B2 | 1/2015 | Adams et al. | |
| 8,928,486 B2 | 1/2015 | Hui et al. | |
| 8,942,894 B2 | 1/2015 | Garner et al. | |
| 8,942,896 B2 | 1/2015 | Mayerle | |
| 8,948,980 B2 | 2/2015 | Garner et al. | |
| 8,985,037 B2 | 3/2015 | Radtke et al. | |
| 9,010,258 B1 | 4/2015 | Richard et al. | |
| 9,043,950 B2 | 6/2015 | Wendte et al. | |
| 9,119,339 B2 | 9/2015 | Bergere | |
| 9,137,942 B2 | 9/2015 | Adams et al. | |
| 9,144,190 B2 | 9/2015 | Henry et al. | |
| 9,148,992 B2 | 10/2015 | Staeter | |
| 9,155,242 B2 | 10/2015 | Adams et al. | |
| 9,179,594 B2 | 11/2015 | Graham | |
| 9,179,595 B2 | 11/2015 | Kormann et al. | |
| 9,198,343 B2 | 12/2015 | Mairman et al. | |
| 9,216,860 B2 | 12/2015 | Friestad et al. | |
| 9,237,687 B2 | 1/2016 | Sauder et al. | |
| 9,265,191 B2 | 2/2016 | Sauder et al. | |
| 9,277,688 B2 | 3/2016 | Wilhelmi et al. | |
| 9,288,937 B2 | 3/2016 | Sauder et al. | |
| 9,313,941 B2 | 4/2016 | Garner et al. | |
| 9,313,943 B2 | 4/2016 | Zumdome et al. | |
| 9,326,441 B2 | 5/2016 | Donadon | |
| 9,332,688 B2 | 5/2016 | Zumdome et al. | |
| 9,345,188 B2 | 5/2016 | Garner et al. | |
| 9,345,189 B2 | 5/2016 | Harmelink et al. | |
| 9,351,440 B2 | 5/2016 | Sauder | |
| 9,357,689 B2 | 6/2016 | Beck et al. | |
| 9,357,692 B2 | 6/2016 | Johnson et al. | |
| 9,398,739 B2 | 7/2016 | Silbernagel et al. | |
| 9,426,939 B2 | 8/2016 | Zumdome | |
| 9,426,940 B2 | 8/2016 | Connors et al. | |
| 9,445,539 B2 | 9/2016 | Rans | |
| 9,451,740 B2 | 9/2016 | Kowalchuk | |
| 9,475,497 B2 | 10/2016 | Henson et al. | |
| 9,480,199 B2 | 11/2016 | Garner et al. | |
| 9,510,502 B2 | 12/2016 | Garner et al. | |
| 9,554,503 B2 | 1/2017 | Noer et al. | |
| 9,578,799 B2 | 2/2017 | Allgaier et al. | |
| 9,585,304 B2 | 3/2017 | Roberge et al. | |
| 9,591,800 B2 | 3/2017 | Kowalchuk et al. | |
| 9,596,803 B2 | 3/2017 | Wendte et al. | |
| 9,603,298 B2 | 3/2017 | Wendte et al. | |
| 9,615,504 B2 | 4/2017 | Sauder et al. | |
| 9,622,401 B2 | 4/2017 | Stevenson | |
| 9,629,298 B2 | 4/2017 | Dienst | |
| 9,635,802 B2 | 5/2017 | Rains et al. | |
| 9,635,804 B2 | 5/2017 | Carr et al. | |
| 9,648,800 B2 | 5/2017 | Gamer et al. | |
| 9,648,802 B2 | 5/2017 | Wendte et al. | |
| 9,661,799 B2 | 5/2017 | Garner et al. | |
| 9,675,002 B2 | 6/2017 | Roszman | |
| 9,675,004 B2 | 6/2017 | Landphair et al. | |
| 9,686,905 B2 | 6/2017 | Garner et al. | |
| 9,686,906 B2 | 6/2017 | Garner et al. | |
| 9,693,496 B2 | 7/2017 | Tevs et al. | |

(56) References Cited

U.S. PATENT DOCUMENTS

| | | |
|---|---|---|
| 9,693,498 B2 | 7/2017 | Zumdome et al. |
| 9,699,955 B2 | 7/2017 | Garner et al. |
| 9,706,701 B2 | 7/2017 | Prickel et al. |
| 9,706,702 B2 | 7/2017 | Wendte et al. |
| 9,706,705 B2 | 7/2017 | Czapka et al. |
| 9,723,779 B2 | 8/2017 | Wendte et al. |
| 9,730,377 B2 | 8/2017 | Kowalchuk et al. |
| 9,730,379 B2 | 8/2017 | Wendte et al. |
| 9,733,634 B2 | 8/2017 | Prickel et al. |
| 9,750,174 B2 | 9/2017 | Sauder et al. |
| 9,756,778 B2 | 9/2017 | Straeter |
| 9,756,779 B2 | 9/2017 | Wilhelmi et al. |
| 9,763,380 B2 | 9/2017 | Hahn et al. |
| 9,769,978 B2 | 9/2017 | Radtke |
| 9,775,279 B2 | 10/2017 | Garner et al. |
| 9,781,874 B2 | 10/2017 | Johnson et al. |
| 9,795,076 B2 | 10/2017 | Lind et al. |
| 9,795,077 B2 | 10/2017 | Hahn et al. |
| 9,801,332 B2 | 10/2017 | Landphair et al. |
| 9,807,922 B2 | 11/2017 | Garner et al. |
| 9,807,924 B2 | 11/2017 | Garner et al. |
| 9,814,172 B2 | 11/2017 | Achen et al. |
| 9,814,176 B2 | 11/2017 | Kowalchuk |
| 9,820,429 B2 | 11/2017 | Garner et al. |
| 9,826,676 B2 | 11/2017 | Borkgren et al. |
| 9,826,677 B2 | 11/2017 | Gervais et al. |
| 9,832,921 B2 | 12/2017 | Anderson et al. |
| 9,836,036 B2 | 12/2017 | Johnson et al. |
| 9,848,524 B2 | 12/2017 | Sauder et al. |
| 9,848,528 B2 | 12/2017 | Werner et al. |
| 9,854,732 B2 | 1/2018 | Thompson et al. |
| 9,861,025 B2 | 1/2018 | Schaefer et al. |
| 9,861,030 B2 | 1/2018 | Garner et al. |
| 9,861,031 B2 | 1/2018 | Garner et al. |
| 9,867,328 B2 | 1/2018 | Tevs et al. |
| 9,869,571 B2 | 1/2018 | Hoberge et al. |
| 9,883,625 B2 | 2/2018 | Kock et al. |
| 9,883,626 B2 | 2/2018 | Heim et al. |
| 9,888,624 B2 | 2/2018 | Maniar et al. |
| 9,894,830 B2 | 2/2018 | Horsch |
| 9,902,571 B2 | 2/2018 | Hui et al. |
| 9,918,427 B2 | 3/2018 | Anderson et al. |
| 9,936,625 B2 | 4/2018 | Wendte et al. |
| 9,936,630 B2 | 4/2018 | Johnson et al. |
| 9,936,631 B1 | 4/2018 | Hubner et al. |
| 9,943,027 B2 | 4/2018 | Sauder et al. |
| 9,949,426 B2 | 4/2018 | Radtke et al. |
| 9,949,427 B2 | 4/2018 | Schweitzer et al. |
| 9,955,625 B2 | 5/2018 | Baurer et al. |
| 9,961,825 B2 | 5/2018 | Allgaier et al. |
| 9,964,124 B2 | 5/2018 | Maro |
| 9,968,029 B2 | 5/2018 | Funck et al. |
| 9,969,569 B2 | 5/2018 | Borkgren |
| 9,970,490 B2 | 5/2018 | Henry et al. |
| 9,974,230 B2 | 5/2018 | Sauder et al. |
| 9,979,338 B2 | 5/2018 | Dollinger et al. |
| 9,999,174 B2 | 6/2018 | Funck et al. |
| 9,999,175 B2 | 6/2018 | Baurer et al. |
| 10,004,173 B2 | 6/2018 | Garner et al. |
| 10,010,025 B2 | 7/2018 | Dienst et al. |
| 10,028,427 B2 | 7/2018 | Amett et al. |
| 10,028,428 B2 | 7/2018 | Moorehead et al. |
| 10,028,436 B2 | 7/2018 | Ricketts et al. |
| 10,045,474 B2 | 8/2018 | Bachman et al. |
| 10,045,478 B2 | 8/2018 | Posselius |
| 10,051,782 B2 | 8/2018 | Wilhelmi et al. |
| 10,064,323 B2 | 9/2018 | Hahn et al. |
| 10,085,375 B2 | 10/2018 | Engel et al. |
| 10,091,926 B2 | 10/2018 | Maro |
| 10,104,830 B2 | 10/2018 | Heathcote |
| 10,117,377 B2 | 11/2018 | Dienst et al. |
| 10,123,524 B2 | 11/2018 | Roberge et al. |
| 10,154,622 B2 | 12/2018 | Thompson |
| 10,159,176 B2 | 12/2018 | Baitinger et al. |
| 10,165,724 B2 | 1/2019 | Nilson et al. |
| 10,172,277 B2 | 1/2019 | Thompson |
| 10,188,027 B2 | 1/2019 | Hahn et al. |
| 10,206,325 B2 | 2/2019 | Schoeny et al. |
| 10,206,326 B2 | 2/2019 | Garner et al. |
| 10,225,978 B1 | 3/2019 | Schoeny et al. |
| 10,227,998 B2 | 3/2019 | Lacher et al. |
| 10,231,376 B2 | 3/2019 | Stanhope et al. |
| 10,257,974 B1 | 4/2019 | Schoeny et al. |
| 10,264,723 B2 | 4/2019 | Gresch et al. |
| 10,278,325 B2 | 5/2019 | Anderson et al. |
| 10,296,017 B2 | 5/2019 | Schoeny et al. |
| 10,299,424 B2 | 5/2019 | Hamilton |
| 10,306,824 B2 | 6/2019 | Nelson et al. |
| 10,308,116 B2 | 6/2019 | Czapka et al. |
| 10,337,645 B2 | 7/2019 | Roberge et al. |
| 10,351,364 B2 | 7/2019 | Green et al. |
| 10,368,478 B2 | 8/2019 | Schoeny et al. |
| 10,375,879 B2 | 8/2019 | Garner et al. |
| 10,379,547 B2 | 8/2019 | Thompson et al. |
| 10,408,667 B2 | 9/2019 | Schoeny et al. |
| 10,426,073 B2 | 10/2019 | Totten et al. |
| 10,433,475 B2 | 10/2019 | Gentili et al. |
| 10,448,561 B2 | 10/2019 | Schoeny et al. |
| 10,455,757 B2 | 10/2019 | Sauder et al. |
| 10,455,758 B2 | 10/2019 | Schoeny et al. |
| 10,455,760 B2 | 10/2019 | Stuber et al. |
| 10,462,956 B2 | 11/2019 | Hamilton |
| 10,462,960 B2 | 11/2019 | Duman |
| 10,470,355 B2 | 11/2019 | Renault et al. |
| 10,477,757 B2 | 11/2019 | Schoeny et al. |
| 10,481,617 B2 | 11/2019 | Engel et al. |
| 10,485,154 B2 | 11/2019 | Connell et al. |
| 10,524,409 B2 | 1/2020 | Posselius et al. |
| 10,524,410 B2 | 1/2020 | Schoeny et al. |
| 10,531,606 B2 | 1/2020 | Posselius |
| 10,537,055 B2 | 1/2020 | Gresch et al. |
| 10,548,259 B2 | 2/2020 | Heathcote |
| 10,555,454 B2 | 2/2020 | Gerner et al. |
| 10,561,052 B2 | 2/2020 | Barrick et al. |
| 10,575,456 B2 | 3/2020 | Schoeny et al. |
| 10,575,459 B2 | 3/2020 | Gervais et al. |
| 10,575,460 B2 | 3/2020 | Davis et al. |
| 10,582,655 B2 | 3/2020 | Kowalchuk |
| 10,602,656 B2 | 3/2020 | Bartelson et al. |
| 10,645,863 B2 | 5/2020 | Grimm et al. |
| 10,653,056 B2 | 5/2020 | Garner et al. |
| 10,660,261 B2 | 5/2020 | Johnson et al. |
| 10,667,461 B2 | 6/2020 | Kowalchuk et al. |
| 10,709,058 B2 | 7/2020 | Thompson |
| 10,729,054 B2 | 8/2020 | Dekam |
| 10,729,063 B2 | 8/2020 | Garner et al. |
| 10,743,460 B2 | 8/2020 | Gilbert et al. |
| 10,750,658 B2 | 8/2020 | Schoeny et al. |
| 10,750,662 B2 | 8/2020 | Garner et al. |
| 10,750,663 B2 | 8/2020 | Garner et al. |
| 10,757,854 B2 | 9/2020 | Stanhope |
| 10,765,057 B2 | 9/2020 | Radtke et al. |
| 10,768,331 B2 | 9/2020 | Koch et al. |
| 10,772,256 B2 | 9/2020 | Stuber |
| 10,779,456 B2 | 9/2020 | Kowalchuk |
| 10,779,460 B2 | 9/2020 | Pirkenseer |
| 10,779,462 B2 | 9/2020 | Gresch et al. |
| 10,806,062 B2 | 10/2020 | Zemenchik |
| 10,806,070 B2 | 10/2020 | Garner et al. |
| 10,806,071 B2 | 10/2020 | Kowalchuk |
| 10,813,276 B2 | 10/2020 | Heathcote |
| 10,820,464 B2 | 11/2020 | Kowalchuk et al. |
| 10,820,465 B2 | 11/2020 | Kowalchuk et al. |
| 10,820,483 B2 | 11/2020 | Gervais et al. |
| 10,820,485 B2 | 11/2020 | Swanson et al. |
| 10,820,488 B2 | 11/2020 | Schoeny et al. |
| 10,820,489 B2 | 11/2020 | Garner et al. |
| 10,820,490 B2 | 11/2020 | Schoeny et al. |
| 10,823,748 B2 | 11/2020 | Allgaier |
| 10,827,663 B2 | 11/2020 | Gresch et al. |
| 10,827,666 B2 | 11/2020 | Schoeny et al. |
| 10,827,671 B2 | 11/2020 | Kowalchuk et al. |
| 10,827,740 B2 | 11/2020 | Wonderlich et al. |
| 10,842,068 B2 | 11/2020 | Czapka et al. |

(56) References Cited

U.S. PATENT DOCUMENTS

| | | |
|---|---|---|
| 10,842,072 B2 | 11/2020 | Wilhelmi et al. |
| 10,842,073 B2 | 11/2020 | Garner et al. |
| 10,860,189 B2 | 12/2020 | Allgaier et al. |
| RE48,572 E | 6/2021 | Garner et al. |
| 11,051,445 B2 * | 7/2021 | Hubner .................. A01C 7/084 |
| 2009/0292426 A1 | 11/2009 | Nelson et al. |
| 2010/0224110 A1 | 9/2010 | Mariman |
| 2011/0067260 A1 | 3/2011 | Kim et al. |
| 2012/0265410 A1 | 10/2012 | Graham et al. |
| 2013/0032363 A1 | 2/2013 | Cuny et al. |
| 2014/0277959 A1 | 9/2014 | Wagers et al. |
| 2015/0223392 A1 | 8/2015 | Wilhelmi et al. |
| 2015/0237793 A1 | 8/2015 | Rans |
| 2016/0229575 A1 | 8/2016 | Lapointe |
| 2017/0000008 A1 | 1/2017 | Anderson et al. |
| 2017/0049040 A1 | 2/2017 | Kinzenbaw |
| 2017/0142891 A1 | 5/2017 | Lucas et al. |
| 2017/0156256 A1 | 6/2017 | Allgaier et al. |
| 2017/0339819 A1 | 11/2017 | Kowalchuk et al. |
| 2017/0359949 A1 | 12/2017 | Garner et al. |
| 2018/0014457 A1 | 1/2018 | Mertlich et al. |
| 2018/0035603 A1 | 2/2018 | Kremmer et al. |
| 2018/0035622 A1 | 2/2018 | Gresch et al. |
| 2018/0049367 A1 | 2/2018 | Garner et al. |
| 2018/0110186 A1 | 4/2018 | Bovee |
| 2018/0116102 A1 | 5/2018 | Taylor et al. |
| 2018/0153094 A1 | 6/2018 | Radtke et al. |
| 2018/0168104 A1 | 6/2018 | Johnson et al. |
| 2018/0192577 A1 | 7/2018 | Smith et al. |
| 2018/0224537 A1 | 8/2018 | Taylor et al. |
| 2018/0249621 A1 | 9/2018 | Horsch |
| 2018/0259979 A1 | 9/2018 | Schoeny et al. |
| 2018/0263177 A1 | 9/2018 | Heathcote |
| 2018/0310468 A1 | 11/2018 | Schoeny et al. |
| 2019/0029165 A1 | 1/2019 | Leimkuehler et al. |
| 2019/0075714 A1 | 3/2019 | Koch et al. |
| 2019/0098828 A1 | 4/2019 | Wilhelmi et al. |
| 2019/0116721 A1 | 4/2019 | Donadon et al. |
| 2019/0116722 A1 | 4/2019 | Donadon et al. |
| 2019/0124824 A1 | 5/2019 | Hubner et al. |
| 2019/0141880 A1 | 5/2019 | Zemenchik et al. |
| 2019/0150350 A1 | 5/2019 | Engel et al. |
| 2019/0159398 A1 | 5/2019 | McMenamy et al. |
| 2019/0162164 A1 | 5/2019 | Funk et al. |
| 2019/0183036 A1 | 6/2019 | Leimkuehler et al. |
| 2019/0223372 A1 | 7/2019 | Koch et al. |
| 2019/0230845 A1 | 8/2019 | Buchner et al. |
| 2019/0230846 A1 | 8/2019 | Koch et al. |
| 2019/0230847 A1 | 8/2019 | Forrest et al. |
| 2019/0239425 A1 | 8/2019 | Garner et al. |
| 2019/0246551 A1 | 8/2019 | Campbell et al. |
| 2019/0246552 A1 | 8/2019 | Sauder et al. |
| 2019/0254222 A1 | 8/2019 | Rhodes et al. |
| 2019/0289774 A1 | 9/2019 | Prystupa et al. |
| 2019/0289776 A1 | 9/2019 | Rempel et al. |
| 2019/0289778 A1 | 9/2019 | Koch et al. |
| 2019/0289779 A1 | 9/2019 | Koch et al. |
| 2019/0343037 A1 | 11/2019 | Werner et al. |
| 2019/0343038 A1 | 11/2019 | Wilhelmi |
| 2019/0364724 A1 | 12/2019 | Radtke et al. |
| 2019/0373797 A1 | 12/2019 | Schoeny et al. |
| 2019/0373801 A1 | 12/2019 | Schoeny et al. |
| 2019/0380259 A1 | 12/2019 | Frank et al. |
| 2019/0387663 A1 | 12/2019 | Wang et al. |
| 2020/0000003 A1 | 1/2020 | Kowalchuk et al. |
| 2020/0000009 A1 | 1/2020 | Henry et al. |
| 2020/0000011 A1 | 1/2020 | Hebner et al. |
| 2020/0000012 A1 | 1/2020 | Hubner et al. |
| 2020/0000013 A1 | 1/2020 | Rylander et al. |
| 2020/0000016 A1 | 1/2020 | Hubner et al. |
| 2020/0008340 A1 | 1/2020 | Stanhope |
| 2020/0015405 A1 | 1/2020 | Kowalchuk et al. |
| 2020/0015406 A1 | 1/2020 | Wright et al. |
| 2020/0022300 A1 | 1/2020 | Gervais et al. |
| 2020/0045869 A1 | 2/2020 | Stanhope et al. |
| 2020/0045877 A1 | 2/2020 | Riffel et al. |
| 2020/0053955 A1 | 2/2020 | Borkgren et al. |
| 2020/0068778 A1 | 3/2020 | Schoeny et al. |
| 2020/0068788 A1 | 3/2020 | Frank et al. |
| 2020/0100421 A1 | 4/2020 | Wang |
| 2020/0100423 A1 | 4/2020 | Dienst |
| 2020/0107487 A1 | 4/2020 | Antich |
| 2020/0107492 A1 | 4/2020 | Antich |
| 2020/0107493 A1 | 4/2020 | Straeter |
| 2020/0107498 A1 | 4/2020 | Anderson et al. |
| 2020/0113118 A1 | 4/2020 | Stanhope |
| 2020/0113169 A1 | 4/2020 | Jelenkovic et al. |
| 2020/0128724 A1 | 4/2020 | Stoller et al. |
| 2020/0128725 A1 | 4/2020 | Rhodes et al. |
| 2020/0132654 A1 | 4/2020 | Pomedli |
| 2020/0146200 A1 | 5/2020 | Schoeny et al. |
| 2020/0156470 A1 | 5/2020 | Stanhope et al. |
| 2020/0196515 A1 | 6/2020 | Engel |
| 2020/0196520 A1 | 6/2020 | Schoeny et al. |
| 2020/0205337 A1 | 7/2020 | Millie et al. |
| 2020/0214193 A1 | 7/2020 | Shivak |
| 2020/0236842 A1 | 7/2020 | Buehler |
| 2020/0245529 A1 | 8/2020 | Thompson et al. |
| 2020/0245535 A1 | 8/2020 | Schilling et al. |
| 2020/0253107 A1 | 8/2020 | Madison et al. |
| 2020/0260630 A1 | 8/2020 | Stanhope et al. |
| 2020/0260633 A1 | 8/2020 | Kovach et al. |
| 2020/0260634 A1 | 8/2020 | Kovach et al. |
| 2020/0260637 A1 | 8/2020 | Thompson et al. |
| 2020/0267355 A1 | 8/2020 | Mentzer |
| 2020/0267882 A1 | 8/2020 | Mcluckie et al. |
| 2020/0281111 A1 | 9/2020 | Walter et al. |
| 2020/0281112 A1 | 9/2020 | Salowitz et al. |
| 2020/0281182 A1 | 9/2020 | Kiefer et al. |
| 2020/0296882 A1 | 9/2020 | Madison et al. |
| 2020/0315081 A1 | 10/2020 | Plattner |
| 2020/0329627 A1 | 10/2020 | Johnson et al. |
| 2020/0329628 A1 | 10/2020 | Mcluckie et al. |
| 2020/0329631 A1 | 10/2020 | Johnson et al. |
| 2020/0337200 A1 | 10/2020 | Smith |
| 2020/0337209 A1 | 10/2020 | Kowalchuk |
| 2020/0337213 A1 | 10/2020 | Schoeny |
| 2020/0337218 A1 | 10/2020 | Puhalla et al. |
| 2020/0337222 A1 | 10/2020 | Anderson et al. |
| 2020/0337223 A1 | 10/2020 | Snipes et al. |
| 2020/0344943 A1 | 11/2020 | Garner et al. |
| 2020/0344944 A1 | 11/2020 | Wonderlich et al. |
| 2020/0352081 A1 | 11/2020 | Arnett et al. |
| 2020/0352087 A1 | 11/2020 | Garner et al. |
| 2020/0355667 A1 | 11/2020 | Schoeny et al. |
| 2020/0359551 A1 | 11/2020 | Donadon et al. |
| 2020/0359557 A1 | 11/2020 | Utz |
| 2020/0359559 A1 | 11/2020 | Koch et al. |
| 2020/0375079 A1 | 12/2020 | Smith et al. |
| 2020/0375088 A1 | 12/2020 | Utz |
| 2020/0375090 A1 | 12/2020 | Morgan et al. |
| 2020/0383262 A1 | 12/2020 | Schoeny et al. |
| 2020/0387720 A1 | 12/2020 | Stanhope |
| 2020/0390022 A1 | 12/2020 | Stanhope |
| 2020/0390025 A1 | 12/2020 | Schoeny et al. |
| 2020/0390026 A1 | 12/2020 | Walter et al. |
| 2020/0396888 A1 | 12/2020 | Steinke et al. |
| 2020/0396889 A1 | 12/2020 | Kowalchuk |
| 2020/0396896 A1 | 12/2020 | Donadon et al. |
| 2020/0396897 A1 | 12/2020 | Stoller et al. |
| 2020/0404831 A1 | 12/2020 | Kowalchuk et al. |
| 2020/0404832 A1 | 12/2020 | Schoeny et al. |
| 2020/0404833 A1 | 12/2020 | Stanhope et al. |
| 2020/0404837 A1 | 12/2020 | Thompson et al. |
| 2021/0007271 A1 | 1/2021 | Schoeny et al. |
| 2021/0007272 A1 | 1/2021 | Schoeny et al. |

FOREIGN PATENT DOCUMENTS

| | | |
|---|---|---|
| BR | 202016000413 U2 | 10/2017 |
| BR | 202016001378 U2 | 10/2017 |
| BR | 102019000833 A2 | 7/2020 |
| CA | 2291598 C | 2/2007 |
| CN | 2857433 Y | 1/2007 |

(56) References Cited

FOREIGN PATENT DOCUMENTS

| | | |
|---|---|---|
| CN | 102763507 A | 11/2012 |
| CN | 203233664 U | 10/2013 |
| CN | 203801244 U | 9/2014 |
| CN | 104956815 A | 10/2015 |
| CN | 105850308 A | 8/2016 |
| CN | 205755411 U | 12/2016 |
| CN | 205993088 U | 3/2017 |
| CN | 106612772 A | 5/2017 |
| CN | 107087462 A | 8/2017 |
| CN | 108064507 A | 5/2018 |
| CN | 107667630 B | 7/2018 |
| CN | 108243683 A | 7/2018 |
| CN | 207573891 U | 7/2018 |
| CN | 108353582 A | 8/2018 |
| CN | 108650948 A | 10/2018 |
| CN | 108781647 A | 11/2018 |
| CN | 109168453 A | 1/2019 |
| CN | 208317369 U | 1/2019 |
| CN | 109451928 A | 3/2019 |
| CN | 109451931 A | 3/2019 |
| CN | 209314270 U | 8/2019 |
| CN | 209314271 U | 8/2019 |
| CN | 111406477 A | 7/2020 |
| CN | 111630983 A | 9/2020 |
| CN | 111886974 A | 11/2020 |
| CN | 212393213 U | 1/2021 |
| DE | 3003919 A1 | 8/1981 |
| DE | 3441704 A1 | 5/1986 |
| DE | 202005002495 U1 | 5/2005 |
| DE | 202005005276 U1 | 6/2005 |
| DE | 202008008487 U1 | 8/2008 |
| DE | 102015101256 A1 | 7/2016 |
| DE | 102015121600 A1 | 6/2017 |
| DE | 102016207510 A1 | 11/2017 |
| DE | 102016218859 A1 | 3/2018 |
| DE | 102017203854 A1 | 9/2018 |
| DE | 102017109042 A1 | 10/2018 |
| DE | 102018111584 A1 | 11/2019 |
| DE | 102018112948 A1 | 12/2019 |
| DE | 102018120184 A1 | 2/2020 |
| DE | 202020102846 U1 | 6/2020 |
| DE | 202020104231 U1 | 7/2020 |
| DE | 102019108987 A1 | 10/2020 |
| DE | 102019118149 A1 | 1/2021 |
| EP | 0237766 A1 | 9/1987 |
| EP | 2374342 B1 | 5/2013 |
| EP | 3127415 A1 | 2/2017 |
| EP | 3135089 A1 | 3/2017 |
| EP | 2853141 B1 | 6/2017 |
| EP | 2974582 B1 | 9/2017 |
| EP | 2901838 B1 | 11/2017 |
| EP | 2832200 B1 | 5/2018 |
| EP | 306552981 | 5/2018 |
| EP | 3332624 A1 | 6/2018 |
| EP | 3338524 A1 | 6/2018 |
| EP | 2932818 B1 | 8/2018 |
| EP | 3366098 A1 | 8/2018 |
| EP | 3219186 B1 | 11/2018 |
| EP | 3440910 A1 | 2/2019 |
| EP | 3440911 A1 | 2/2019 |
| EP | 2959762 B1 | 5/2019 |
| EP | 3305054 B1 | 7/2019 |
| EP | 3284332 B1 | 10/2019 |
| EP | 3278649 B1 | 11/2019 |
| EP | 3281509 B1 | 11/2019 |
| EP | 3372064 B1 | 2/2020 |
| EP | 3360403 A1 | 4/2020 |
| EP | 3372065 B1 | 4/2020 |
| EP | 3417689 B1 | 4/2020 |
| EP | 3440909 B1 | 4/2020 |
| EP | 3127414 B1 | 5/2020 |
| EP | 3530095 B1 | 9/2020 |
| EP | 3501250 B1 | 11/2020 |
| EP | 3520592 B1 | 12/2020 |
| FR | 2961058 A1 | 12/2011 |
| GB | 1253688 A | 11/1971 |
| GB | 2057835 A | 4/1981 |
| JP | 2005333895 A | 12/2005 |
| JP | 2013027389 A | 2/2013 |
| JP | 6523898 B2 | 6/2019 |
| JP | 6545240 B2 | 7/2019 |
| JP | 6546363 B2 | 7/2019 |
| JP | 2019150070 A | 9/2019 |
| JP | 2019165712 A | 10/2019 |
| RU | 2230446 C1 | 6/2004 |
| RU | 2649332 C1 | 4/2018 |
| WO | 1994026090 A2 | 11/1994 |
| WO | WO2004017712 A1 | 3/2004 |
| WO | 2010088703 A1 | 8/2010 |
| WO | WO2015048867 A1 | 4/2015 |
| WO | WO2016071269 A1 | 5/2016 |
| WO | WO2017004074 A1 | 1/2017 |
| WO | 2017040533 A1 | 3/2017 |
| WO | 2017117638 A1 | 7/2017 |
| WO | 2018013859 A1 | 1/2018 |
| WO | WO2018054624 A1 | 3/2018 |
| WO | WO2018054625 A1 | 3/2018 |
| WO | 2018093568 A2 | 5/2018 |
| WO | WO2019050944 A1 | 3/2019 |
| WO | WO2019079205 A1 | 4/2019 |
| WO | WO2019091732 A1 | 5/2019 |
| WO | WO2019108881 A1 | 6/2019 |
| WO | WO2019197963 A1 | 10/2019 |
| WO | WO2020001964 A1 | 1/2020 |
| WO | WO2020011386 A1 | 1/2020 |
| WO | WO2020016047 A1 | 1/2020 |
| WO | WO2020035337 A1 | 2/2020 |
| WO | WO2020039322 A1 | 2/2020 |
| WO | WO2020046586 A1 | 3/2020 |
| WO | WO2020049387 A1 | 3/2020 |
| WO | WO2020109881 A1 | 6/2020 |
| WO | WO2020161566 A1 | 8/2020 |
| WO | WO2020187380 A1 | 9/2020 |
| WO | WO2020194150 A1 | 10/2020 |
| WO | WO2020227608 A1 | 11/2020 |
| WO | WO2020240301 A1 | 12/2020 |
| WO | WO2020247985 A1 | 12/2020 |
| WO | WO2021014231 A1 | 1/2021 |

OTHER PUBLICATIONS

Precision Planting, Precision Planting From County Line AG Services, Keeton Seed Firmers, http://countylineag.ohag4u.com/precision_planting.htm, Feb. 8, 2019, 2 pages.

Lamb and Webster, PrecisionMeter, Improve Planter Performance Where it Counts—In the Meter, http://www.lambandwebster.com/precision-planting/precisionmeter/, 2017, 4 pages.

Planterology, SpeedTube, https://planterology.com/solutions/speedtube/, Feb. 12, 2019, 5 pages.

John Deere, John Deere Exactmerge Planter Trench Delivery System and Brushbelt Delivery System, Cross Implement, https://crossimplement.com/news-and-updates/article/2015/06/john-deere-exactemerge-planter-trench-delivery-system-and-brushbelttm-delivery-system, Jun. 11, 2015, 6 pages.

Lamb and Webster, SpeedTube, Focused on the Perfect Plant—and Speed., http://www.lambandwebster.com/precision-planting/speedtube/, 2017, 6 pages.

Precision Planting, PrecisionMeter A Better Finger Meter, Improve Planter Performance Where it Counts—In the Meter, https://www.precisionplanting.com/products/product/precisionmeter, Mar. 7, 2019, 15 pages.

U.S. Appl. No. 16/726,346, filed Dec. 24, 2019, Chad Michael Johnson.

U.S. Appl. No. 16/726,388, filed Dec. 24, 2019, Chad Michael Johnson.

U.S. Appl. No. 16/726,404, filed Dec. 24, 2019, Chad Michael Johnson.

U.S. Appl. No. 16/726,470, filed Dec. 24, 2019, Chad Michael Johnson.

U.S. Appl. No. 16/726,501, filed Dec. 24, 2019, Chad Michael Johnson.

(56) References Cited

OTHER PUBLICATIONS

U.S. Appl. No. 16/726,528, filed Dec. 24, 2019, Chad Michael Johnson.
U.S. Appl. No. 16/726,558, filed Dec. 24, 2019, Chad Michael Johnson.
U.S. Appl. No. 16/726,598, filed Dec. 24, 2019, Chad Michael Johnson.
U.S. Appl. No. 16/726,619, filed Dec. 24, 2019, Chad Michael Johnson.
U.S. Appl. No. 16/726,648, filed Dec. 24, 2019, Chad Michael Johnson.
U.S. Appl. No. 16/726,670, filed Dec. 24, 2019, Chad Michael Johnson.

* cited by examiner

PARTICLE DELIVERY SYSTEM OF AN AGRICULTURAL ROW UNIT

BACKGROUND

The present disclosure relates generally to a particle delivery system of an agricultural row unit.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product delivery system (e.g., including a metering system and a seed tube) is configured to deposit seeds and/or other agricultural products (e.g., fertilizer) into the trench. The opener/agricultural product delivery system is followed by closing discs that move displaced soil back into the trench and/or a packer wheel that packs the soil on top of the deposited seeds/other agricultural products.

Certain row units, or planting implements generally, include a seed storage area configured to store the seeds. The agricultural product delivery system is configured to transfer the seeds from the seed storage area into the trench. For example, the agricultural product delivery system may include a metering system that meters the seeds from the seed storage area into a seed tube for subsequent delivery to the trench. Certain types of seeds may benefit from a particular spacing along the trench. Additionally, the planting implement having the row units may travel at varying speeds based on the type of seed being deposited into the soil, the type and structure of the soil within the field, and other factors. Typically, the row units output the seeds to the trench at the speed that the implement is traveling through the field, which may affect the spacing between the seeds and may cause the seeds to move relative to a target location in the trench.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a particle delivery system of an agricultural row unit includes a shuttle track configured to be disposed adjacent to a particle metering and singulation unit, shuttles movably disposed along the shuttle track, and a track belt disposed inwardly of the shuttle track. Each shuttle is configured to receive a particle from the particle metering and singulation unit at a particle reception section of the shuttle track and release the particle toward a trench in soil at a particle deposition section of the shuttle track. The track belt includes paddles, and each paddle is configured to move a respective shuttle along a particle transfer section of the shuttle track from the particle reception section to the particle deposition section.

DRAWINGS

These and other features, aspects, and advantages of the present disclosure will become better understood when the following detailed description is read with reference to the accompanying drawings in which like characters represent like parts throughout the drawings, wherein.

Figure 2:
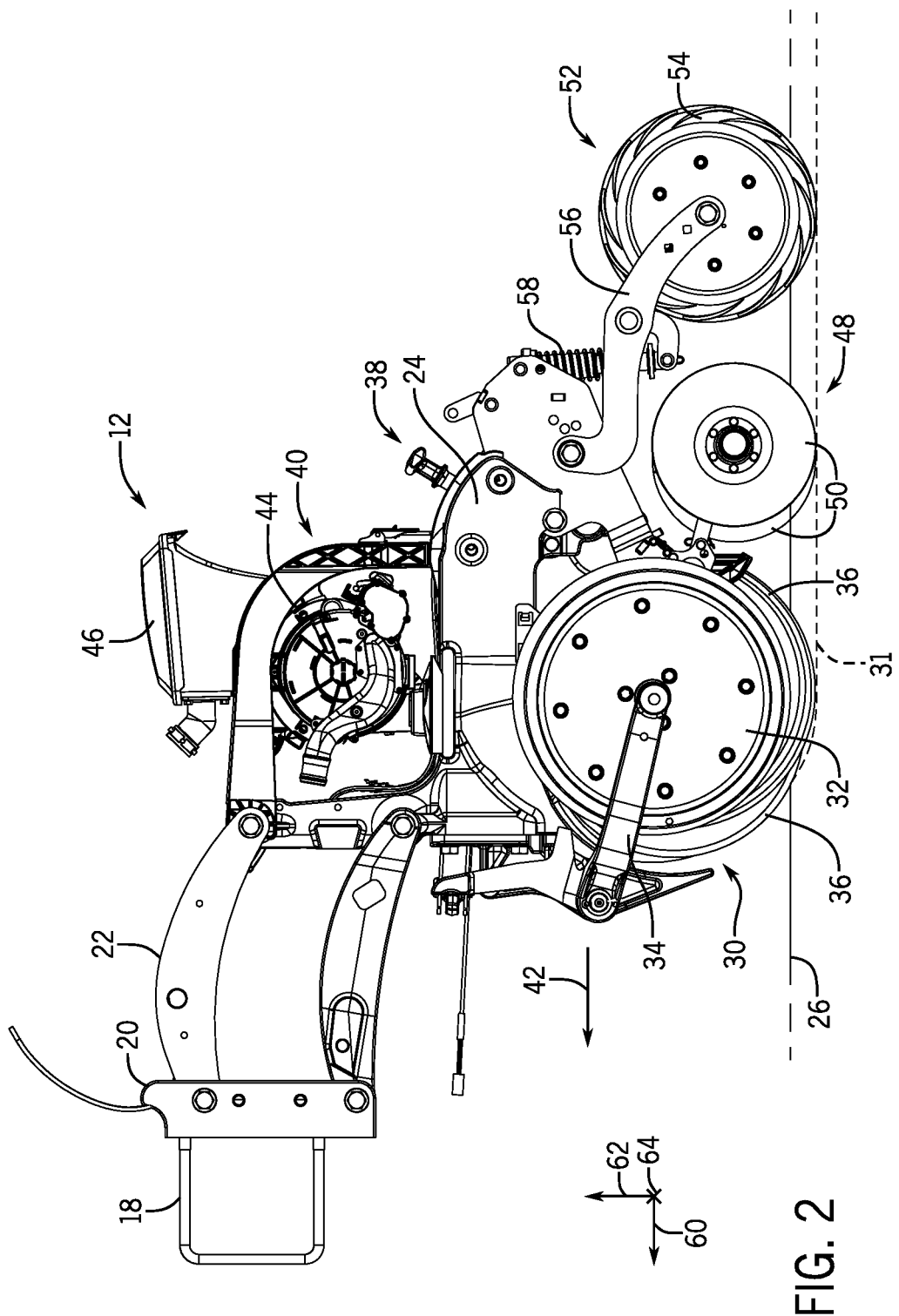
FIG. 2 is a side view of an embodiment of a row unit that may be employed on the agricultural implement of FIG. 1, in accordance with an aspect of the present disclosure.
Figure 11:
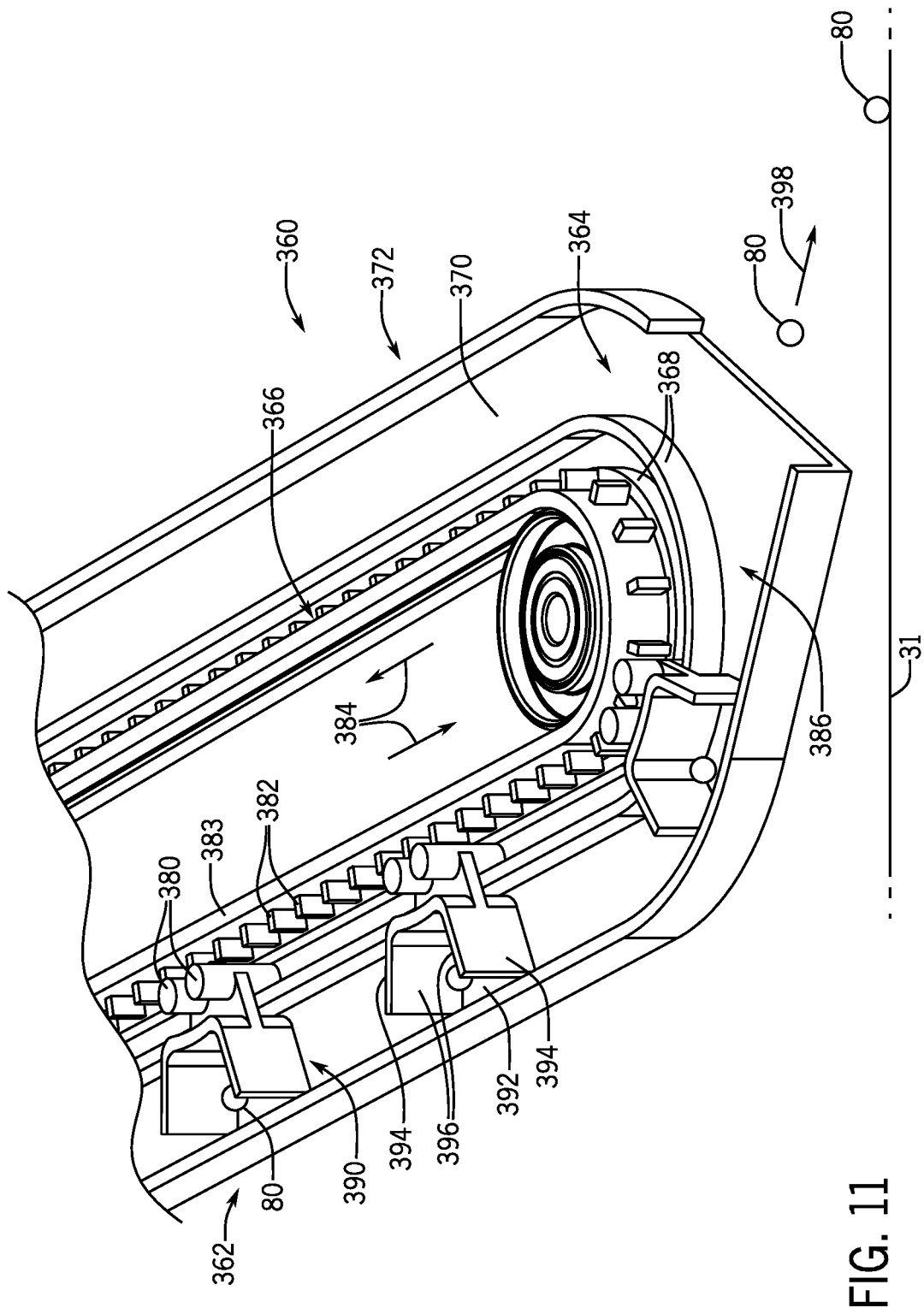
Figure 12:
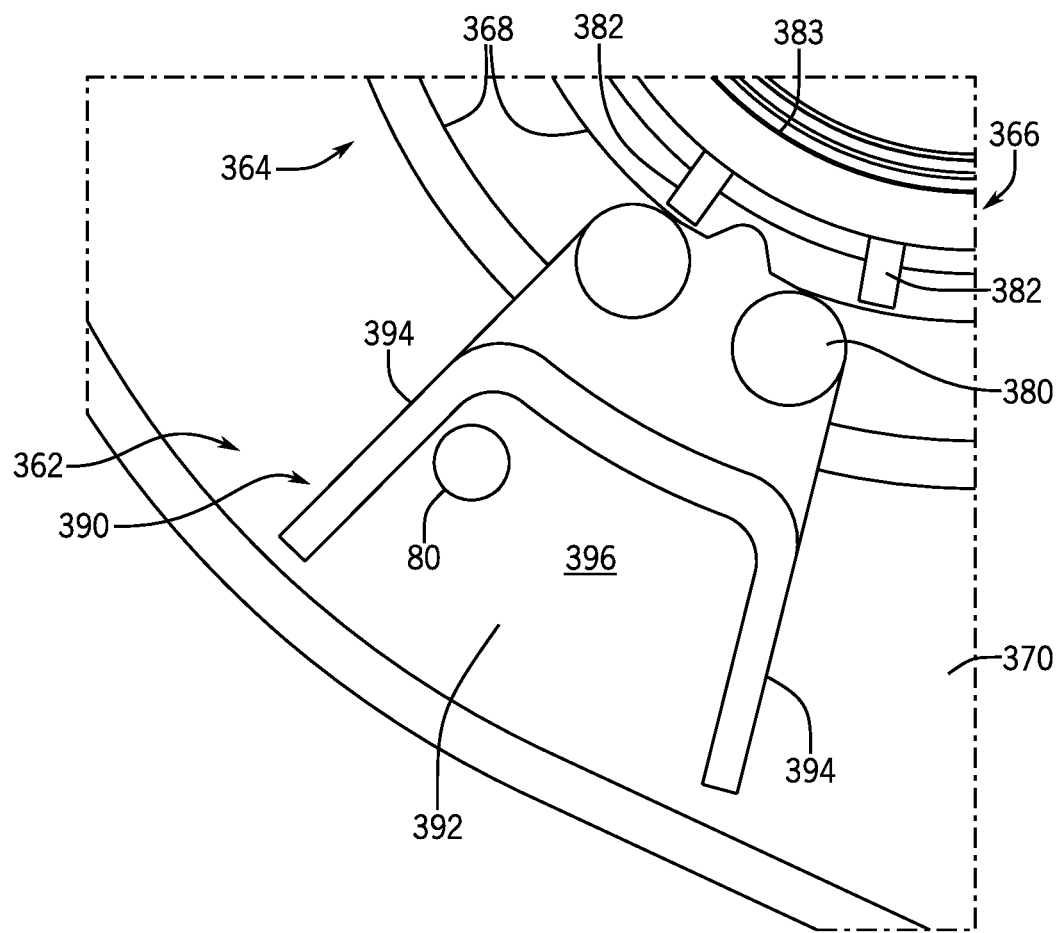

FIG. 11 is a perspective view of another embodiment of a particle delivery system that may be employed within the row unit of FIG. 2, in accordance with an aspect of the present disclosure; and FIG. 12 is a side view of an embodiment of a shuttle track, a shuttle engaged with the shuttle track, and a track belt engaged with the shuttle of the particle delivery system of FIG. 11, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a particle delivery system for a row unit of an agricultural implement. Certain agricultural implements include row units configured to deliver particles (e.g., seeds) to trenches in soil. For example, a particle distribution system may transport the particles from a storage tank of the agricultural implement to the row units (e.g., to a hopper assembly of each row unit or directly to a particle delivery system of each row unit), and/or the particles may be delivered from a hopper assembly of each row unit to a respective particle delivery system. Each particle delivery system may output the particles to a respective trench as the agricultural implement travels over the soil. Certain agricultural implements are configured to travel at particular speeds (e.g., between four kilometers per hour (kph) and thirty kph) while delivering the particles to the trenches. Additionally, a particular spacing between the particles when disposed within the soil may enhance plant development and/or yield.

Accordingly, in certain embodiments, at least one row unit of the agricultural implement includes a particle delivery system configured to deliver the particles to the respective trench in the soil at a particular spacing while reducing the relative ground speed of the particles (e.g., the speed of the particles relative to the ground). The particle delivery system includes a particle metering and singulation unit (e.g., including a metering wheel, a metering disc, etc.) configured to meter individual particles, thereby establishing the particular spacing between particles. The particle metering and singulation unit is configured to deliver the particles from a release point of the particle metering and singulation unit to shuttles configured to move along a shuttle track. For example, the shuttle track may be disposed adjacent to the particle metering and singulation unit. Each shuttle is configured to receive a respective particle from the particle metering and singulation unit at a particle reception section of the shuttle track, move along the shuttle track, and deposit the particle into the trench in the soil at a particle deposition section of the shuttle track. The particle delivery system may include the shuttles, the shuttle track, and a track belt (e.g., an endless member) configured to move the shuttles along the shuttle track. In certain embodiments, the shuttles, the shuttle track, and the track belt may form a shuttle assembly included in the particle delivery system.

The track belt includes paddles that extend outwardly and adjacent to the shuttle track. Each paddle is configured to move a respective shuttle along the shuttle track from the particle reception section, to the particle deposition section, and to a shuttle queue section of the shuttle track. At the shuttle queue section, the shuttles may queue to receive the particles at the particle reception section. The track belt may disengage the shuttles at or prior to the shuttle queue section. The track belt may rotate to move the shuttles along the shuttle track and to accelerate the particles disposed within the shuttles to a target particle exit speed at the particle deposition section of the shuttle track. For example, the track belt may accelerate the particles to a speed greater than a speed resulting from gravitational acceleration alone. As such, the particle delivery system may enable the row unit to travel faster than traditional row units that utilize seed tubes, which rely on gravity to accelerate the particles (e.g., seeds) for delivery to the soil.

Figure 1:
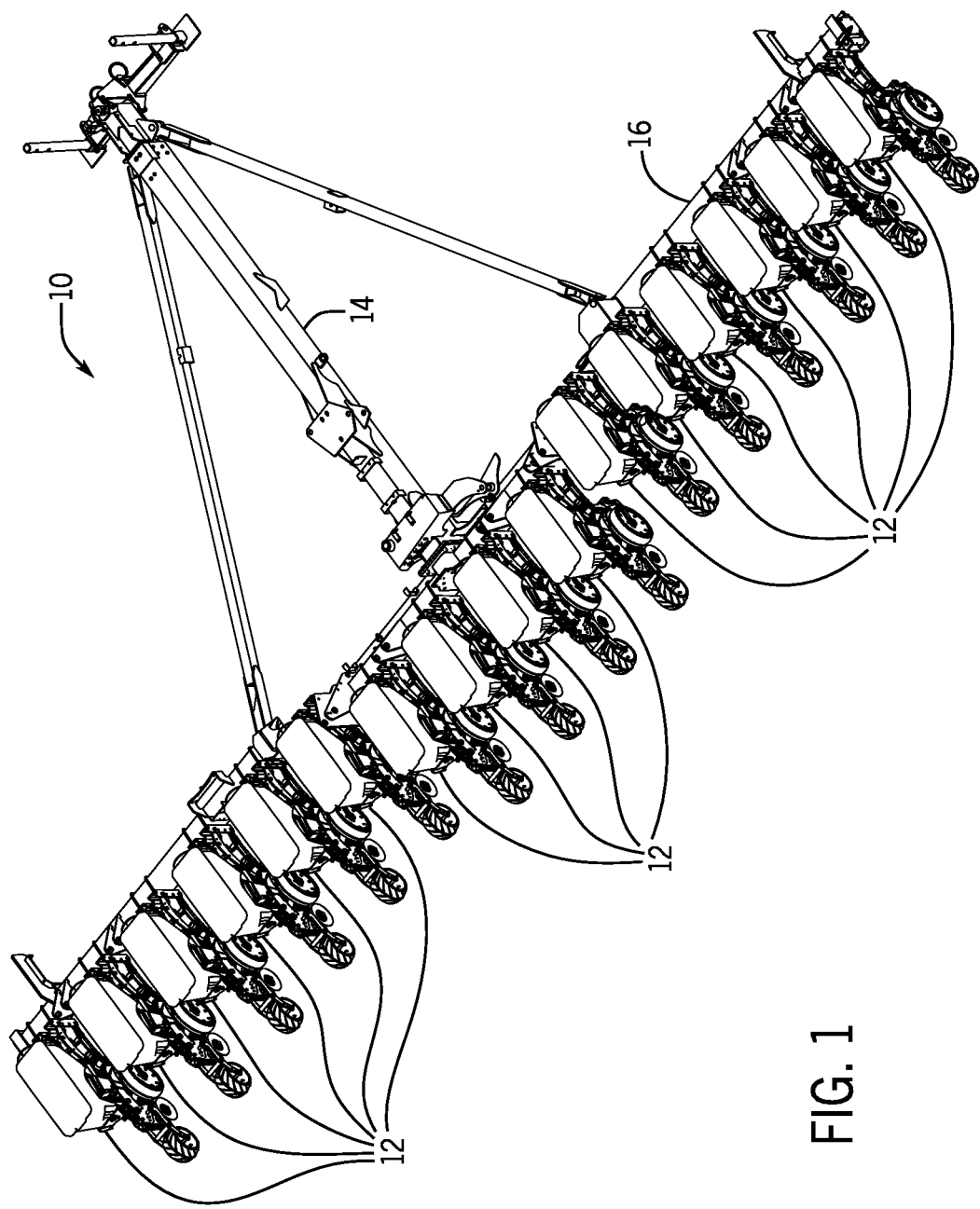
FIG. 1 is a perspective view of an embodiment of an agricultural implement having multiple row units distributed across a width of the agricultural implement, in accordance with an aspect of the present disclosure.

With the foregoing in mind, the present embodiments relating to particle delivery systems may be utilized within any suitable agricultural implement. For example, FIG. 1 is a perspective view of an embodiment of an agricultural implement 10 having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a particle path (e.g., trench) within soil of a field. The row unit 12 may also include a particle delivery system (e.g., including a particle metering and singulation unit and a particle belt assembly) configured to deposit particles (e.g., seeds, fertilizer, and/or other agricultural product(s)) into the particle path/trench. In addition, the row unit 12 may include closing disc(s) and/or a packer wheel positioned behind the particle delivery system. The closing disc(s) are configured to move displaced soil back into the particle path/trench, and the packer wheel is configured to pack soil on top of the deposited particles.

During operation, the agricultural implement 10 may travel at a particular speed along the soil surface while depositing the particles to the trenches. For example, a speed of the agricultural implement may be selected and/or controlled based on soil conditions, a type of the particles delivered by the agricultural implement 10 to the soil, a size (e.g., a nominal and/or an average size) of the particles, weather conditions, a size/type of the agricultural implement, or a combination thereof. Additionally or alternatively, a particular spacing between the particles when disposed within the soil may enhance plant development and/or yield. Accordingly, in certain embodiments, at least one row unit 12 may include a particle delivery system configured to deposit the particles at the particular spacing while reducing the ground speed of the particles (e.g., as compared to a row unit that employs a particle tube to delivery particles to the soil). As discussed in detail below, the particle delivery system may include a particle metering and singulation unit configured to meter individual particles and shuttles configured to receive the particles. Additionally, the particle delivery system may include a track belt configured to move the shuttles along a shuttle track toward the trench in the soil. For example, the track belt may accelerate the particles to a target particle exit speed that is greater than a speed resulting from gravitational acceleration alone.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a U-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 includes an opener assembly 30 that forms a trench 31 in the soil surface 26 for particle deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate the trench 31 into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil.

The row unit 12 includes a particle delivery system 40 configured to deposit particles (e.g., seeds, fertilizer, and/or other agricultural product(s)) into the trench 31 at a desired depth beneath the soil surface 26 as the row unit 12 traverses the field along a direction of travel 42. As illustrated, the particle delivery system 40 includes a particle metering and singulation unit 44 configured to receive the particles (e.g., seeds) from a hopper assembly 46 (e.g., a particle storage area). In certain embodiments, the hopper assembly may be integrally formed with a housing of the particle metering and singulation unit. The hopper assembly 46 is configured to store the particles for subsequent metering by the particle metering and singulation unit 44 and delivery to the soil by shuttles of the particle delivery system 40. As will be described in greater detail below, in some embodiments, the particle metering and singulation unit 44 includes a particle disc configured to rotate to transfer the particles from the hopper assembly 46 toward shuttles of the particle delivery system 40. The shuttles may move along a shuttle track of the particle delivery system 40 to deliver the particles to the trench 31.

The opener assembly 30 and the particle delivery system 40 are followed by a closing assembly 48 that moves displaced soil back into the trench 31. In the illustrated embodiment, the closing assembly 48 includes two closing discs 50. However, in alternative embodiments, the closing assembly may include other closing devices (e.g., a single closing disc, etc.). In addition, in certain embodiments, the closing assembly may be omitted. In the illustrated embodiment, the closing assembly 48 is followed by a packing assembly 52 configured to pack soil on top of the deposited particles. The packing assembly 52 includes a packer wheel 54, an arm 56 that pivotally couples the packer wheel 54 to the frame 24, and a biasing member 58 configured to urge the packer wheel 54 toward the soil surface 26, thereby enabling the packer wheel to pack soil on top of the deposited particles (e.g., seeds and/or other agricultural product(s)). While the illustrated biasing member 58 includes a spring, in alternative embodiments, the biasing member may include another suitable biasing device, such as a hydraulic cylinder or a pneumatic cylinder, among others. For purposes of discussion, reference may be made to a longitudinal axis or direction 60, a vertical axis or direction 62, and a lateral axis or direction 64. For example, the direction of travel 42 of the row unit 12 may be generally along the longitudinal axis 60.

Figure 3:
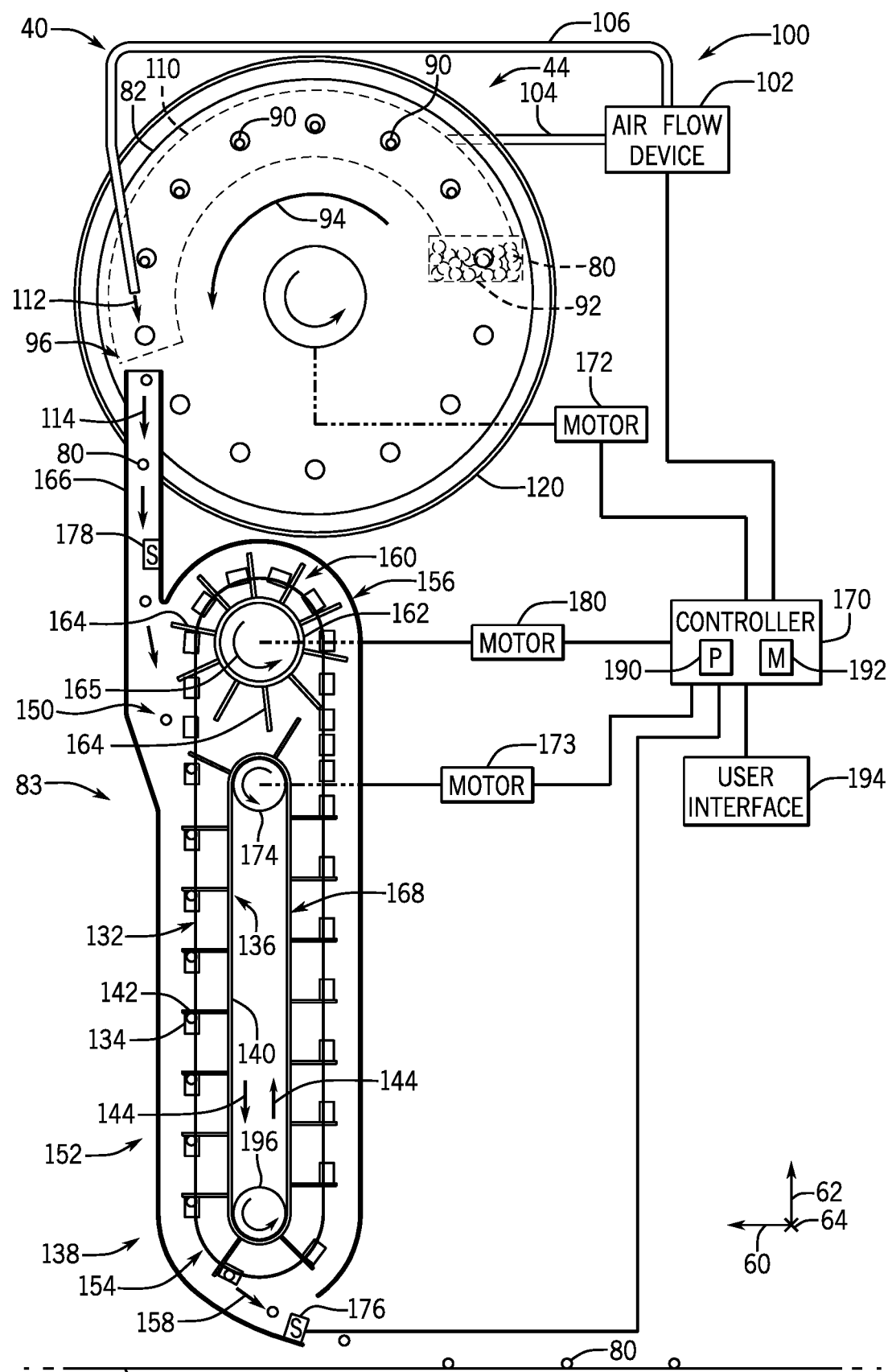
FIG. 3 is a side view of an embodiment of a particle delivery system that may be employed within the row unit of FIG. 2, in accordance with an aspect of the present disclosure.

FIG. 3 is a side view of an embodiment of a particle delivery system 40 that may be employed within the row unit of FIG. 2. As described above, the particle delivery system 40 is configured to meter and accelerate particles 80 (e.g., seeds, fertilizer, other particulate material, or a combination thereof) toward the trench 31 for deposition into the trench 31. For example, the particle delivery system 40 includes a particle disc 82 (e.g., of the particle metering and singulation unit 44) configured to meter the particles 80 and a shuttle assembly 83 configured to accelerate and move the particles 80 toward the trench 31 for deposition into the trench 31.

The particle disc 82 has apertures 90 configured to receive the particles 80 from a particle hopper 92 of the particle delivery system 40. For example, each aperture 90 may receive a single particle 80. The particle hopper 92 is a particle storage area configured to store the particles 80 for subsequent metering and distribution by the particle delivery system 40. In certain embodiments, the particle hopper 92 may be coupled to and/or included as part of a housing of the particle metering and singulation unit 44. In some embodiments, the hopper assembly may feed the particles 80 into the particle hopper 92, and/or the hopper assembly may be coupled to the particle hopper 92. The particle disc 82 is configured to rotate, as indicated by arrow 94, to move the particles 80 from the particle hopper 92 to a release point 96, where the particles 80 are released downwardly toward the shuttle assembly 83.

The disc 82 having the apertures 90 may be any suitable shape configured to rotate/move to transfer the particles 80 from the particle hopper 92 to the release point 96. For example, the disc 82 may be generally flat, may have a curved portion and a flat portion, may be entirely curved, may be a drum, or may include other suitable shapes, geometries, and/or configurations. In certain embodiments, an inner portion of the disc 82 may curved/raised related to an outer portion of the disc 82 having the apertures 90 (e.g., the disc 82 may be generally bowl-shaped), such that the particles 80 may be directed toward the apertures 90 (e.g., away from the raised inner portion and/or toward the flat outer portion) as the disc 82 rotates. In some embodiments, the disc 82 may be a drum having the apertures 90 disposed along an outer portion and/or an exterior of the drum.

As illustrated, the particle delivery system 40 includes an air flow system 100 having an air flow device 102 (e.g., a vacuum source), a first air tube 104 fluidly coupled to the air flow device 102, and a second air tube 106 fluidly coupled to the air flow device 102. The air flow system 100 is configured to reduce the air pressure within a vacuum passage 110 positioned along a portion of the particle disc 82, thereby drawing the particles 80 from the particle hopper 92 toward and against the apertures 90. As illustrated, the first air tube 104 is fluidly coupled to the air flow device 102 and to the vacuum passage 110. The air flow device 102 is configured to draw air through the apertures 90 aligned with the vacuum passage 110, via the first air tube 104. As the particle disc 82 rotates, the vacuum formed at the apertures 90 secures the particles 80 to the apertures 90, such that the particle disc 82 moves the particles 80 from the particle hopper 92 to the release point 96. At the release point 96, the air flow system 100 provides, via the second air tube 106, an air flow 112 configured to remove each particle 80 from the respective aperture 90 (e.g., by overcoming the vacuum formed at the respective aperture 90). In certain embodiments, the air flow 112 may be omitted, and the particles 80 may be released from the apertures 90 due to the vacuum passage 110 ending. For example, at the release point 96, the vacuum passage 110 may end (e.g., the air flow device 102 may no longer draw air through the apertures 90 of the particle disc 82 at the release point 96), and the particles 80 may no longer be secured in the apertures 90. The particles 80 are released from the particle disc 82 along a release trajectory 114. Rotation of the particle disc 82 imparts a velocity on the particles, and the particles 80 accelerate from the particle disc 82 along the release trajectory 114 under the influence of gravity and/or due to the force applied by the air flow 112. In some embodiments, an angle between the release trajectory 114 and the vertical axis 62 may be zero degrees, one degree, two degrees, five degrees, ten degrees, twenty degrees, or other suitable angles. As used herein, "vacuum" refers to an air pressure that is less than the ambient atmospheric air pressure, and not necessarily 0 pa.

The particle delivery system 40 includes a disc housing 120. The particle disc 82 is disposed within and configured to rotate within the disc housing 120. The vacuum passage 110 of the particle metering and singulation unit 44 is formed within the disc housing 120. The particle metering and singulation unit 44 includes the particle disc 82 and the disc housing 120.

The particle metering and singulation unit 44 is configured to deliver the particles 80 to the shuttle assembly 83 of the particle delivery system 40. The shuttle assembly 83 is configured to accelerate the particles 80 toward the trench 31. In the illustrated embodiment, the shuttle assembly 83 includes a shuttle track 132, shuttles 134 coupled to and configured to move along the shuttle track 132, a track belt 136 (e.g., an endless member) disposed inwardly of the shuttle track 132, and a shuttle housing 138. The shuttle track 132, the shuttles 134, and the track belt 136 are disposed within the shuttle housing 138. The track belt 136 includes a base 140 and paddles 142 extending from the base 140. The paddles 142 are configured to contact and move the shuttles 134 along the shuttle track 132. For example, the track belt 136 is configured to rotate, as indicated by arrows 144, to move the shuttles 134 along the shuttle track 132. The base 140 and/or the paddles 142 may be formed from a flexible and resilient material, such as rubber, configured to flex during operation of the particle delivery system 40 (e.g., the paddles 142 may flex during contact with and while driving movement of the shuttles 134). In certain embodiments, the paddles 142 may be rigidly (e.g., substantially rigidly coupled to the base 140, such that the paddle 142 do not flex relative to the base 140 and/or a flexibility of the paddles 142 relative to the base 140 is substantially limited. In some embodiments, the paddles 142 and/or the base 140 may be a hard plastic configured to substantially limit the flexibility of the paddles 142 relative to the base 140.

The shuttle track 132 includes a particle reception section 150, a particle transfer section 152, a particle deposition section 154, and a shuttle queue section 156. At the particle reception section 150, the shuttles 134 receive the particles 80. In certain embodiments, the particle delivery system may provide/establish a vacuum within the shuttles at the particle reception section to direct the particles toward and/or secure the particles within the shuttles. The shuttles 134 move along the particle transfer section 152 to transfer the particles 80 from the particle reception section 150 to the particle deposition section 154. As described in greater detail below in reference to FIG. 4, the shuttle assembly 83 may be configured to capture the particles 80 between the shuttles 134 and the shuttle housing 138. In embodiments with the vacuum formed within the shuttle at the particle reception section, the vacuum may be released once the shuttle captures the particle between the shuttle and the shuttle housing. At the particle deposition section 154, each shuttle 134 releases/deposits the respective particle 80 along a release trajectory 158 into the trench 31. The shuttles 134 queue at the shuttle queue section 156 prior to receiving the particles 80 at the particle reception section 150. The track belt 136 is configured to rotate to move shuttles 134 from the particle reception section 150, along the particle transfer section 152 and the particle deposition section 154, and to the shuttle queue section 156.

The particle delivery system 40 includes a track wheel assembly 160 (e.g., a rotation mechanism) disposed along the shuttle queue section 156 of the shuttle track 132. The track wheel assembly 160 is configured to rotate to drive movement of the shuttles 134 along the shuttle queue section 156 toward the particle reception section 150 of the shuttle track 132. For example, the track wheel assembly 160 includes a first wheel 162 and paddles 164 coupled to and extending from the first wheel 162. The first wheel 162 is configured to rotate, as indicated by arrow 165, to drive rotation of the paddles 164 along the shuttle queue section 156 of the shuttle track 132. The rotation of the paddles 164 drives movement of the shuttles 134 along the shuttle queue section 156 and to the particle reception section 150 of the shuttle track 132. For example, the paddles 164 may contact the shuttles 134 and push the shuttles 134 along the shuttle queue section 156.

In certain embodiments, the particle reception section may overlap with the shuttle queue section, such that the shuttles are configured to receive the particle while queue in the shuttle queue section. The overlap of the particle reception section and the shuttle queue section may enable the shuttles to receive the particles while traveling at a slower speed along the shuttle track relative to other portions of the shuttle track, such as the particle transfer section and/or the particle deposition section.

As illustrated, the particle delivery system 40 includes a particle transfer assembly 166 (e.g., a particle tube) extending generally from the release point 96 to the particle reception section 150 of the shuttle track 132. The particle transfer assembly 166 is coupled to the disc housing 120 and the shuttle housing 138. The particle transfer assembly 166 is configured to at least partially direct the particles 80 from the particle disc 82 (e.g., from the release point 96) to the shuttles 134 along the release trajectory 114. In certain embodiments, the particle transfer assembly may be omitted, such that the particles flow from the release point to the shuttles without guidance from the particle transfer assembly. The particle transfer assembly may include any suitable shape and/or configuration configured to at least particle direct the particles, such as a channel, a cylindrical tube, a rectangular tube, and/or other suitable shapes/configurations.

As illustrated, a portion 168 of the track belt 136 extends from the particle deposition section 154 of the shuttle track 132 to the shuttle queue section 156 of the shuttle track 132. As the track belt 136 rotates, the portion 168 is configured to move the shuttles 134 from the particle deposition section 154 to the shuttle queue section 156. For example, the track belt 136 may transfer the shuttles 134 directly to the track wheel assembly 160 at the shuttle queue section 156 of the shuttle track 132. In other embodiments and as described in greater detail below in reference to FIGS. 8 and 9, the track belt and/or the track wheel assembly may be disposed and/or shaped differently.

As described above, the particle disc 82 is configured to meter the particles 80 and to provide a spacing between the particles 80. The spacing between the particles 80 when disposed within the trench 31 may enhance plant development and/or yield. Additionally, the particle delivery system 40 is configured to accelerate the particles 80 generally toward the trench 31. The acceleration of the particles 80 by the particle delivery system 40 may enable the row unit to travel faster than traditional row units that utilize seed tubes, which may rely solely on gravity to accelerate the particles 80 for delivery to the soil. The particle delivery system 40 may be configured to accelerate the particles 80 via the air flow system 100, gravity, and the shuttle assembly 83. For example, the air flow system 100 may be configured to provide the air flow 112 to remove the particles 80 from the particle disc 82 and to accelerate the particles downwardly along the release trajectory 114. Additionally, the particle delivery system 40 is configured to enable the particles 80 to accelerate under the influence of gravity as the particles 80 travel between the particle disc 82 and the shuttle assembly 83. The shuttle assembly 83 is configured to accelerate the particles 80 received from the particle disc 82, such that a particle exit speed of each particle 80 expelled from the shuttle assembly 83 along the release trajectory 158 (e.g., expelled from a respective shuttle 134 at the particle deposition section 154 of the shuttle track 132) reaches a target particle exit speed. In certain embodiments, the air flow system may be omitted. For example, a tangential speed of the track belt 136 (e.g., a speed of the shuttles 134) may be greater than a tangential speed of the apertures 90 of the particle disc 82.

The particle delivery system 40 includes a controller 170 configured to control the rotation rate (e.g., the rotational speed) of the particle disc 82 to adjust/control the spacing between the particles 80. For example, the controller 170 may control a first motor 172, which is configured to drive rotation of the particle disc 82, to adjust/control the rotation rate of the particle disc 82 (e.g., by outputting an output signal to the first motor 172 indicative of instructions to adjust the rotation rate of the particle disc 82). Additionally, the controller 170 may control the first motor 172 to achieve a target spacing between the particles 80. The controller 170 may determine the target spacing between the particles 80 based on a type of the particles 80, an input received from a user interface, a ground speed of the row unit, or a combination thereof. The spacing may be any suitable spacing, such as one centimeter, two centimeters, five centimeters, ten centimeters, fifty centimeters, one meter, two meters, five meters, etc. In certain embodiments, the controller 170 may control the rotation rate of the particle disc 82 (e.g., via control of the first motor 172) to achieve the target spacing based on a reference table identifying rotational speeds of the particle disc 82 that will achieve particular spacings, based on an empirical formula, in response to sensor feedback, or a combination thereof.

Additionally, the controller 170 is configured to control the belt speed (e.g., rotation rate) of the track belt 136 to adjust/control the particle exit speed of the particles 80 expelled from the shuttles 134 (e.g., at the particle deposition section 154 of the shuttle track 132, and toward the trench 31), such that the particle exit speed of each particle reaches a target particle exit speed. For example, the controller 170 may control a second wheel 174, via a second motor 173 configured to drive rotation of the second wheel 174 and the track belt 136, (e.g., by outputting an output signal indicative of instructions to adjust the belt speed of the track belt 136 to the second motor 173) thereby adjusting/controlling the belt speed of the track belt 136 and a particle speed of the particles 80 within the shuttles 134. The controller 170 may determine the target particle exit speed of the particles 80 based on the type of the particles 80, the size of the particles 80, an input received from a user interface, the ground speed of the row unit, or a combination thereof. The target particle exit speed may be any suitable speed, such one kilometer per hour (kph), two kph, three kph, five kph, ten kph, fifteen kph, twenty kph, etc. In certain embodiments, the controller 170 may determine the target particle exit speed as a target percentage of the ground speed of the row unit (e.g., thirty percent, fifty percent, sixty percent, seventy percent, eighty percent, ninety percent, ninety-five percent, one hundred percent, etc.).

To control the belt speed of the track belt 136, the controller 170 may receive an input signal indicative of the particle exit speed of the particle 80 at the particle deposition section 154 of the shuttle track 132. For example, the controller 170 may receive the input signal from a particle sensor 176 of the particle delivery system 40 disposed adjacent to the particle deposition section 154 and along the release trajectory 158. The particle sensor 176 may include an infrared sensor or another suitable type of sensor configured to output the input signal indicative of the particle exit speed of each particle 80 expelled from the shuttles 134. The particle sensor 176 may be positioned a fixed distance from the particle deposition section 154 of the shuttle track 132, such that the controller 170 may determine the particle exit speed of the particle 80 at the particle deposition section 154 based on the fixed distance and the input signal indicative of the particle exit speed received from the particle sensor 176 (e.g., based on deceleration of the particle 80 traveling the fixed distance). In certain embodiments, the particle sensor 176 may be configured output a signal indicative of the ground speed of the agricultural row unit to the controller 170, and/or the controller 170 may receive the signal indicative of the ground speed from another source. In some embodiments, the particle sensor 176 may be omitted from the particle delivery system 40. In certain embodiments, the controller 170 may determine other information related to the particles 80 based on feedback from the particle sensor 176, such as skips (e.g., the particle 80 not being present during an expected time period), multiple particles 80 (e.g., multiple particles 80 being present when only a single particle 80 is expected), an amount of particles 80 deposited over a given area (e.g., an amount of particles 80 deposited per acre), and other information related to the particles 80. In some embodiments, the controller 170 may control the particle delivery system based on such feedback.

The controller 170 may compare the particle exit speed of the particle 80 at the particle deposition section 154 of the shuttle track 132 to the target particle exit speed to determine whether a difference between the particle exit speed and the target particle exit speed exceeds a threshold value. In response to a determination that the particle exit speed at the particle deposition section 154 of the shuttle track 132 is less than the target particle exit speed and the difference between the particle exit speed and the target particle exit speed exceeds the threshold value, the controller 170 may output an output signal indicative of instructions to increase the belt speed of the track belt 136. For example, the controller 170 may output the output signal to the second motor 173 to cause the second motor 173 to increase the rotation rate of the second wheel 174, thereby increasing the belt speed of the track belt 136. The increase in the belt speed of the track belt 136 may increase the movement speed of the shuttles 134 and the particle exit speed of the particles 80 within the shuttles 134 at the particle deposition section 154, such that the particle exit speed reaches the target particle exit speed (e.g., such that the difference between the particle exit speed and the particle exit speed is less than the threshold value).

In response to a determination that the particle exit speed at the particle deposition section 154 of the shuttle track 132 is greater than the target particle exit speed and the difference between the particle exit speed and the target particle exit speed exceeds the threshold value, the controller 170 may output an output signal indicative of instructions to decrease the belt speed of the track belt 136. For example, the controller 170 may output the output signal to the second motor 173 to cause the second motor 173 to decrease the rotation rate of the second wheel 174, thereby decreasing the belt speed of the track belt 136. The decrease in the belt speed of the track belt 136 may decrease the movement speed of the shuttles 134 and the particle exit speed of the particles 80 within the shuttles 134 at the particle deposition section 154, such that the particle exit speed reaches the target particle exit speed (e.g., such that the difference between the particle exit speed and the target particle exit speed is less than the threshold value).

In certain embodiments, the controller 170 is configured to control the air flow 112 provided by the air flow system 100 to adjust/control a particle transfer speed of each particle 80 expelled from the particle disc 82 (e.g., from the release point 96 of the particle disc 82, along the release trajectory 114, and toward the particle reception section 150 of the shuttle track 132), such that the particle transfer speed reaches a target particle transfer speed at the particle reception section 150 of the shuttle track 132. For example, the controller 170 may control the air flow device 102 configured to provide the air flow 112 to accelerate each particle 80 along the release trajectory 114. In certain embodiments, the controller 170 may control a valve configured to adjust a flow rate of the air flow 112. The controller 170 may determine the target particle transfer speed of the particles 80 based on the belt speed of the track belt 136 and/or the type of the particles 80. The target particle transfer speed may be any suitable speed, such one-tenth kph, one-half kph, one kph, two kph, three kph, five kph, ten kph, fifteen kph, twenty kph, etc. In certain embodiments, the controller 170 may determine the target particle transfer speed as a target percentage of the belt speed of the particle belt 84 (e.g., thirty percent, fifty percent, seventy percent, eighty percent, ninety percent, ninety-five percent, etc.).

To control the air flow 112 provided by the air flow system 100, the controller 170 may receive an input signal indicative of the particle transfer speed of the particle 80 at the particle reception section 150 of the shuttle track 132. For example, the controller 170 may receive the input signal from a particle sensor 178 of the particle delivery system 40 disposed within the particle transfer assembly 166. The particle sensor 178 may include an infrared sensor or another suitable type of sensor configured to output the input signal indicative of the particle transfer speed of each particle 80 at the particle reception section 150. The particle sensor 178 may be positioned a fixed distance from the particle reception section 150, such that the controller 170 may determine the particle transfer speed of the particle 80 at the particle reception section 150 based on the fixed distance and the input signal indicative of the particle transfer speed received from the particle sensor 178 (e.g., based on gravitational acceleration of the particle 80 traveling the fixed distance from the particle sensor 178 to the particle reception section 150 and/or based on acceleration due to the air flow 112).

The controller 170 may compare the particle transfer speed of the particle 80 at the particle reception section 150 of the shuttle track 132 to the target particle transfer speed to determine whether a difference between the particle transfer speed and the target particle transfer speed exceeds a threshold value. In response to determining that the particle transfer speed at the particle reception section 150 is less than the target particle transfer speed and the difference between the particle transfer speed and the target particle transfer speed exceeds the threshold value, the controller 170 may output an output signal indicative of instructions to increase the flow rate of the air flow 112 provided by the air flow system 100. For example, the controller 170 may output the output signal to the air flow device 102 to cause the air flow device 102 to increase the flow rate of the air flow 112. The increase in the flow rate may increase the particle transfer speed, such that the particle transfer speed reaches the target particle transfer speed (e.g., such that the difference between the particle transfer speed and the target particle transfer speed is less than the threshold value).

In response to determining that the particle transfer speed at the particle reception section 150 of the shuttle track 132 is greater than the target particle transfer speed and the difference between the particle transfer speed and the target particle transfer speed exceeds the threshold value, the controller 170 may output an output signal indicative of instructions to decrease the flow rate of the air flow 112 provided by the air flow system 100. For example, the controller 170 may output the output signal to the air flow device 102 to cause the air flow device 102 to decrease the flow rate of the air flow 112. The decrease in the flow rate may decrease the particle transfer speed, such that the particle transfer speed reaches the target particle transfer speed (e.g., such that the difference between the particle transfer speed and the target particle transfer speed is less than the threshold value).

In certain embodiments, the controller 170 may control rotation of the track wheel assembly 160 to control movement of the shuttles 134 along the shuttle queue section 156 of the shuttle track 132. For example, the controller 170 may control the first wheel 162 of the track wheel assembly 160, via a third motor 180 configured to drive rotation of the track wheel assembly 160, (e.g., by outputting an output signal indicative of instructions to adjust the rotation rate of the first wheel 162 to the third motor 180) thereby adjusting/controlling the movement of the shuttles 134 along the shuttle queue section 156. The controller 170 may determine a target rotation rate of the track wheel assembly 160 based on a type of the particles 80, a number of the shuttles 134 within the shuttle queue section 156, a number of the shuttles 134 in the particle delivery system 40, a rotation rate of the particle disc 82 (e.g., to match the rotation rate of the particle disc 82), or a combination thereof. In certain embodiments, the controller 170 may determine the target rotation rate of the track wheel assembly 160 based on the length of the shuttles 134 relative to the length of the shuttle queue section 156 of the shuttle track 132, the length of the shuttles 134 relative to the length of the shuttle track 132, the length of the shuttle queue section 156 relative to the length of the shuttle track 132, or a combination thereof. In some embodiments, the controller 170 may control the rotation rate of the track wheel assembly 160, such that the rotation rate is within a threshold range of a target rotation rate.

As illustrated, the controller 170 of the particle delivery system 40 includes a processor 190 and a memory 192. The processor 190 (e.g., a microprocessor) may be used to execute software, such as software stored in the memory 192 for controlling the particle delivery system 40 (e.g., for controlling the rotational speed of the particle disc 82, the belt speed of the track belt 136, the air flow 112 provided by the air flow system 100, etc.). Moreover, the processor 190 may include multiple microprocessors, one or more "general-purpose" microprocessors, one or more special-purpose microprocessors, and/or one or more application specific integrated circuits (ASICS), or some combination thereof. For example, the processor 190 may include one or more reduced instruction set (RISC) or complex instruction set (CISC) processors.

The memory device 192 may include a volatile memory, such as random access memory (RAM), and/or a nonvolatile memory, such as read-only memory (ROM). The memory device 192 may store a variety of information and may be used for various purposes. For example, the memory device 192 may store processor-executable instructions (e.g., firmware or software) for the processor 190 to execute, such as instructions for controlling the particle delivery system 40. In certain embodiments, the controller 170 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the target particle exit speed), instructions (e.g., software or firmware for controlling the particle delivery system 40), and any other suitable data. The processor 190 and/or the memory device 192, and/or an additional processor and/or memory device, may be located in any suitable portion of the system. For example, a memory device for storing instructions (e.g., software or firmware for controlling portions of the particle delivery system 40) may be located in or associated with the particle delivery system 40.

Additionally, the particle delivery system 40 includes a user interface 194 that is communicatively coupled to the controller 170. The user interface 194 may be configured to inform an operator of the particle exit speed of the particles 80, to enable the operator to adjust the rotational speed of the particle disc 82, to enable the operator to adjust the air flow 112 provided by the air flow system 100, to enable the operator to adjust the belt speed of the track belt 136, to provide the operator with selectable options of the type of particles 80, and to enable other operator interactions. For example, the user interface 194 may include a display and/or other user interaction devices (e.g., buttons) configured to enable operator interactions. The particle delivery system 40 includes a third wheel 196 engaged with the track belt 136 adjacent to the particle deposition section 154 of the shuttle track 132 and configured to rotate to facilitate rotation of the track belt 136. For example, as the second wheel 174 drives rotation of the track belt 136, the third wheel 196 may rotate to facilitate rotation of the track belt 136.

Figure 4:
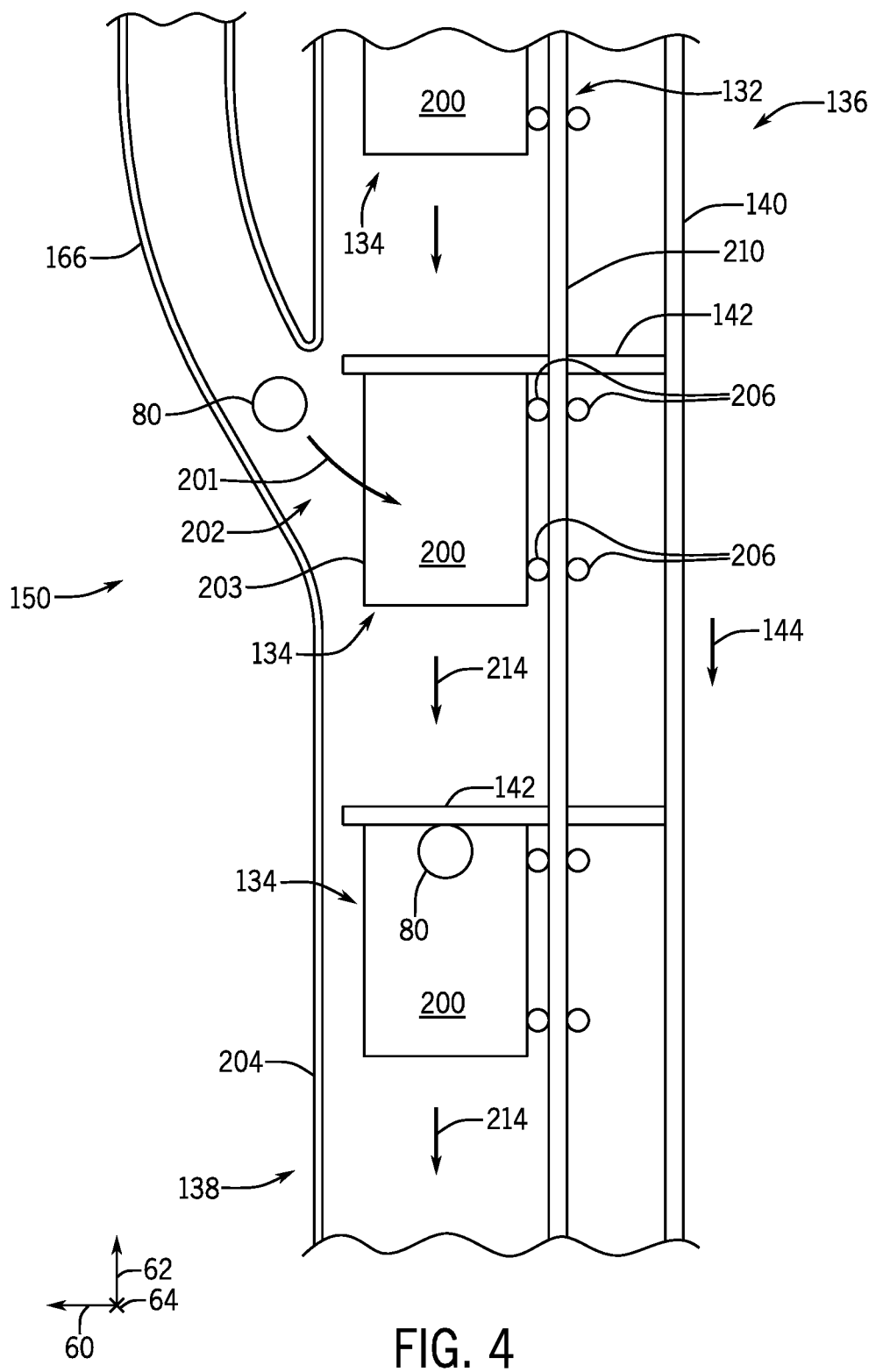
FIG. 4 is a side view of an embodiment of shuttles and a shuttle track of that may be employed within the particle delivery system of FIG. 3, in accordance with an aspect of the present disclosure.

FIG. 4 is a side view of an embodiment of shuttles 134 and a shuttle track 132 that may be employed within the particle delivery system of FIG. 3. As illustrated, each shuttle 134 includes a particle holder 200 configured to receive a respective particle 80, as indicated by arrow 201, at the particle reception section 150 of the shuttle track 132 and to hold the particle 80. For example, each particle 80 may flow through a particle reception aperture 202 of the shuttle housing 138 to a respective particle holder 200. In certain embodiments, a vacuum may be formed within the particle holder of the shuttle, such as via the air flow system of the particle delivery system, while the shuttle is at the particle reception section to direct the particle toward and secure the particle within the particle holder of the shuttle. As illustrated, the particle reception aperture 202 is formed within the shuttle housing 138 adjacent to the particle reception section 150 of the shuttle track 132. Each shuttle 134 receives a respective particle 80 via an opening 203 of the particle holder 200. In certain embodiments, each shuttle 134 may hold the respective particle 80 within the particle holder 200, and movement of the particle out of the opening 203 may be blocked by a connecting panel 204 of the shuttle housing 138. As described in greater detail below, the shuttle housing 138 may include side panels coupled to and disposed on lateral sides of the connecting panel 204. Additionally, each shuttle 134 includes wheels 206 configured to movably couple the particle holder 200 to rails 210 of the shuttle track 132. In certain embodiments, the particle holders, or the shuttles generally, may be coupled to the shuttle track by other device(s)/system(s) (e.g., magnets and/or low-friction materials, such as nylon, Teflon, ultra-high molecular weight polyethylene (UHMW-PE), etc.). In some embodiments, the shuttle track may be omitted, the shuttles may be directly coupled to the track belt, and the track belt may rotate to move the particles within the shuttles toward the trench. In such embodiments, the track wheel assembly may receive each shuttle from the track belt and return each shuttle to the track belt, or the track wheel assembly may be omitted from the particle delivery system. As illustrated, the shuttle track 132 includes two rails 210. In certain embodiments, the shuttle track may include a single rail along which the shuttles are configured to move.

As described above, each paddle 142 of the track belt 136 is configured to contact a respective shuttle 134 (e.g., the particle holder 200 of the respective shuttle 134) to move the shuttle 134 along the shuttle track 132. For example, as the track belt 136 rotates, as indicated by arrow 144, the paddle 142 may contact the particle holder 200 of the shuttle 134 and may drive the shuttle 134 along the rails 210 of the shuttle track 132, as indicated by arrows 214. The track belt may drive the shuttles 134 from the particle reception section 150 of the shuttle track 132 to the particle deposition section of the shuttle track 132 for deposition of the particles 80 into the trench in soil.

Figure 5:
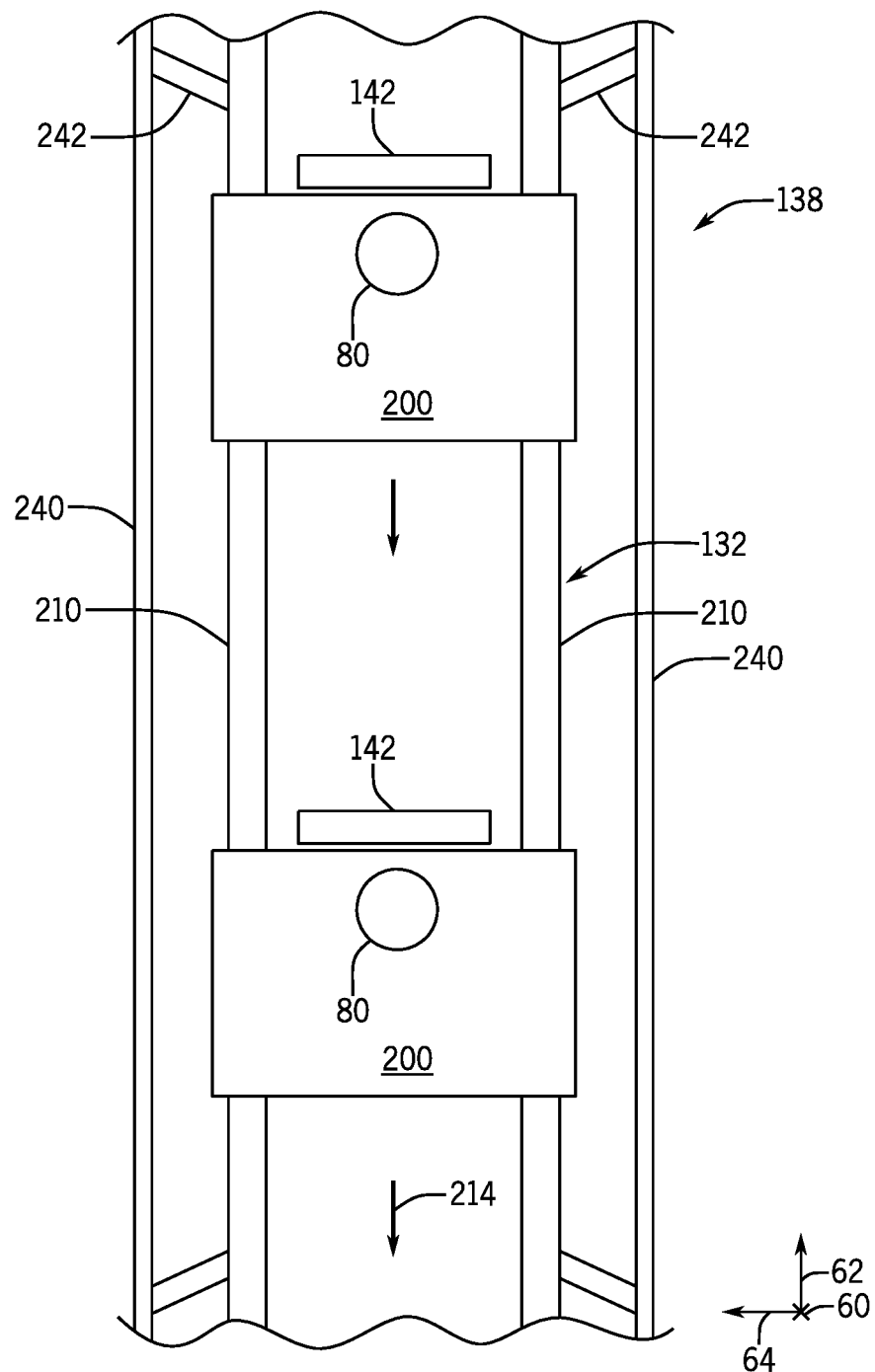
FIG. 5 is a front view of the shuttles and the shuttle track of FIG. 4, in accordance with an aspect of the present disclosure.

FIG. 5 is a front view of the shuttles 134 and the shuttle track 132 of FIG. 4. As illustrated, the shuttle housing 138 includes side panels 240 coupled to the rails 210 of the shuttle track 132 via struts 242 (e.g., the shuttle track 132 is fixed/coupled to the shuttle housing 138). In certain embodiments, the shuttle track may be coupled to the shuttle housing via other device(s)/connector(s). Additionally, the paddles 142 of the track belt extend between the rails 210 of the shuttle track 132 to contact and drive movement of the shuttles 134.

Figure 6:
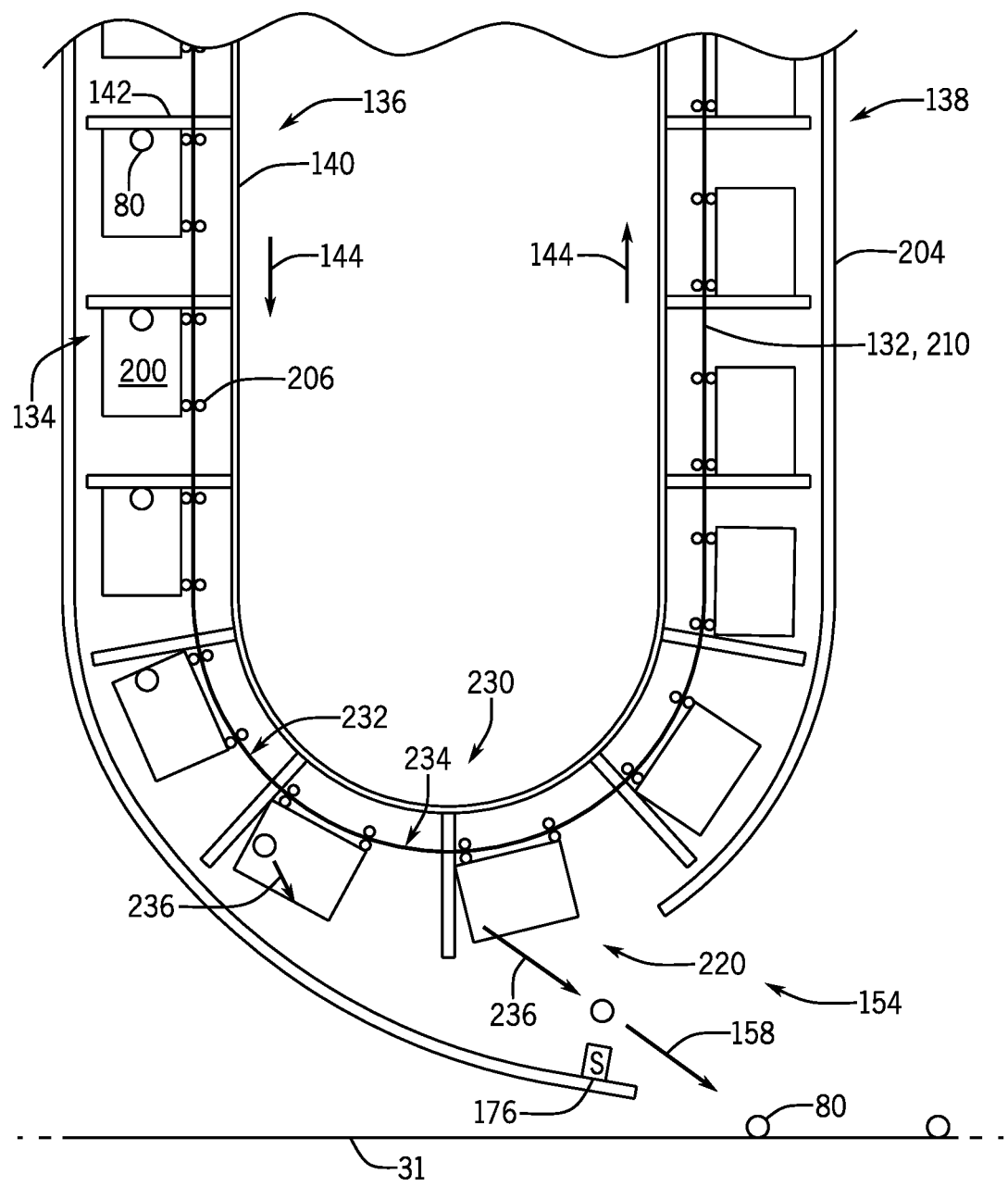
FIG. 6 is a side view of an embodiment of a particle deposition section of a shuttle track that may be employed within the particle delivery system of FIG. 3, in accordance with an aspect of the present disclosure.

FIG. 6 is a side view of an embodiment of a particle deposition section 154 of a shuttle track 132 that may be employed within the particle delivery system of FIG. 3. As described above, the track belt 136 is configured to rotate, as indicated by arrows 144, to drive movement of the shuttles 134 from the particle reception section toward the particle deposition section 154, along the particle deposition section 154, and from the particle deposition section 154 toward the shuttle queue section of the shuttle track 132. At the particle deposition section 154, the shuttles 134 deposit/release the particles 80 toward the trench 31 along the release trajectory 158. For example, the particles 80 may flow through a particle deposition aperture 220 of the shuttle housing 138. In certain embodiments, each particle 80 may be released from a respective shuttle 134 at the particle deposition aperture 220 as movement of the particle 80 through the opening in the particle holder 200 is no longer blocked by the connecting panel 204 of the shuttle housing 138.

As illustrated, the particle deposition section 154 of the shuttle track 132 is positioned at a curved section 230 of the shuttle track 132. Movement of the shuttles 134 along the curved section 230 drives the particles 80 within the shuttles 134 radially outwardly from the shuttles 134, through the particle deposition aperture 220, and toward the trench 31. For example, at a first portion 232 of the curved section 230, a respective particle 80 may be disposed within the particle holder 200 of the shuttle 134. As the shuttle 134 moves from the first portion 232 toward a second portion 234 of the curved section 230, centrifugal force applied to the particle 80 causes the particle 80 to move radially outwardly, as indicated by arrows 236. As such, the curved section 230 may facilitate deposition of the particles 80 from the shuttles 134 to the trench 31. In other embodiments, the particle deposition section may be positioned elsewhere along the shuttle track.

Figure 7:
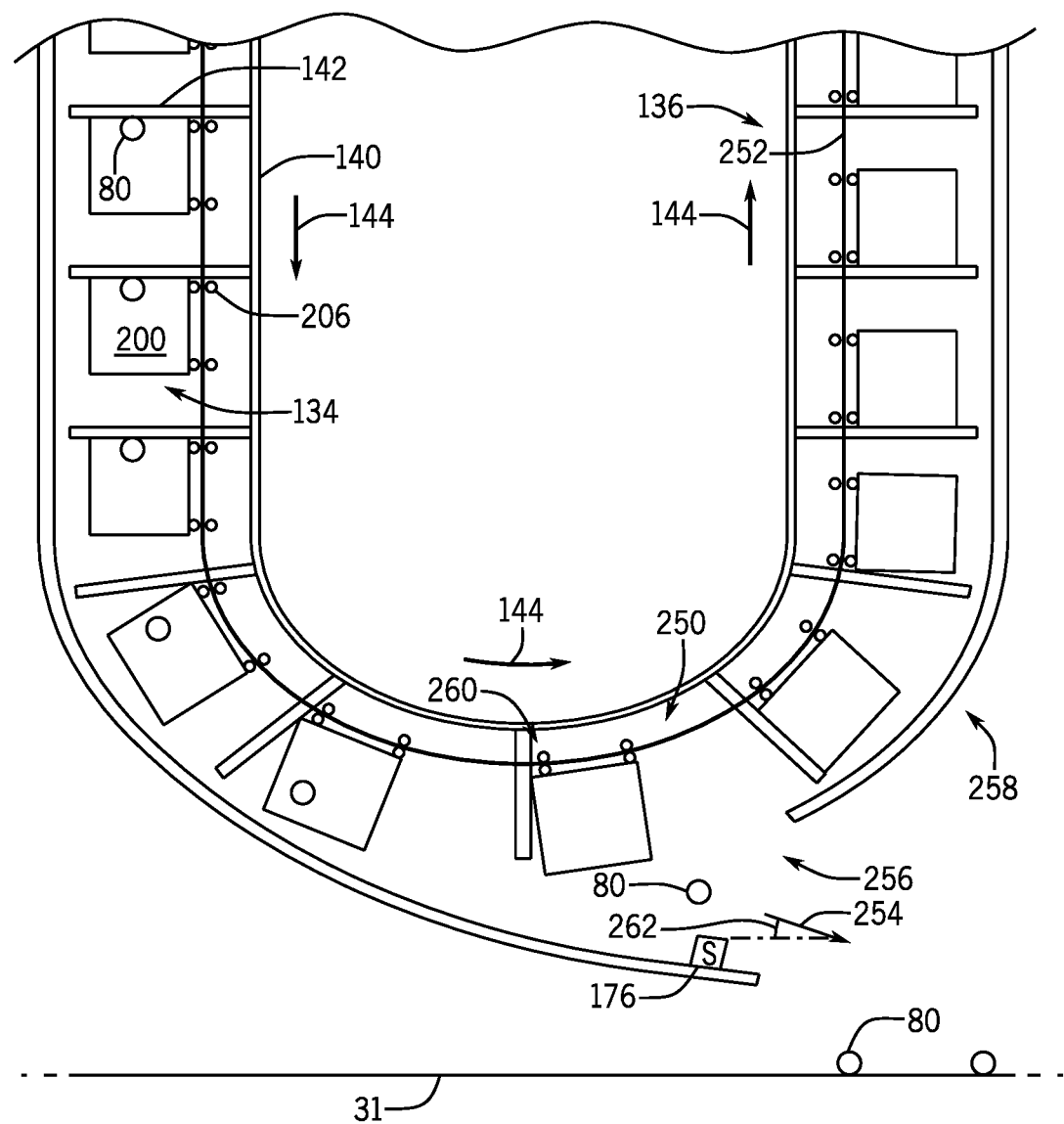
FIG. 7 is a side view of another embodiment of a particle deposition section of a shuttle track that may be employed within the particle delivery system of FIG. 3, in accordance with an aspect of the present disclosure.

FIG. 7 is a side view of another embodiment of a particle deposition section 250 of a shuttle track 252 that may be employed within the particle delivery system of FIG. 3. The track belt 136 is configured to rotate, as indicated by arrows 144, to drive movement of the shuttles 134 from a particle reception section of the shuttle track 252 toward the particle deposition section 250, along the particle deposition section 250, and from the particle deposition section 250 toward a shuttle queue section of the shuttle track 252. At the particle deposition section 250, the shuttles 134 deposit/release the particles 80 toward the trench 31 along a release trajectory 254. For example, the particles 80 may flow through a particle deposition aperture 256 of a shuttle housing 258 of the particle delivery system. In certain embodiments, each particle 80 may be released from a respective shuttle 134 at the particle deposition aperture 256 as movement of the particle 80 through the opening 203 is no longer blocked by the connecting panel 204 of the shuttle housing 258.

As illustrated, the particle deposition section 250 of the shuttle track 252 is positioned at a straight section 260 of the shuttle track 252. The straight section 260 is configured to extend generally along the trench 31 in soil. Movement of the shuttles 134 along the straight section 260 and the force of gravity drives the particles 80 to exit the shuttles 134 along the release trajectory 254 at a release angle 262 (e.g., an acute angle) relative to the trench 31. For example, as a respective shuttle 134 moves along the straight section 260, gravity may draw the particle 80 from the shuttle 134 and toward the trench 31. The particle 80 within the shuttle 134 may move generally along the straight section 260 and may be released from the shuttle 134 along the release trajectory 254. The release angle 262 between the release trajectory 254 and the trench 31 may be any acute angle, such as one degree, two degrees, five degrees, fifteen degrees, twenty degrees, twenty-five degrees, thirty-five degrees, fifty degrees, sixty-five degrees, eighty degrees, etc. Release of the particles 80 along the release trajectory 254 at the release angle 262 may facilitate acceleration of the particles 80 to the target particle exit speed. For example, in certain embodiments, the target particle speed may be a percentage of the ground speed of the row unit. As such, the straight section 260 may enable the belt/shuttles to accelerate the particles 80 to the target particle exit speed in a direction substantially opposite the direction of travel of the row unit (e.g., along the release trajectory 254 extending at the release angle 262 relative to the trench 31). Accordingly, a substantial portion of the particle exit speed may be directed along the longitudinal axis and along the trench 31, thereby reducing the speed at which the particle 80 contacts the soil.

Figure 8:
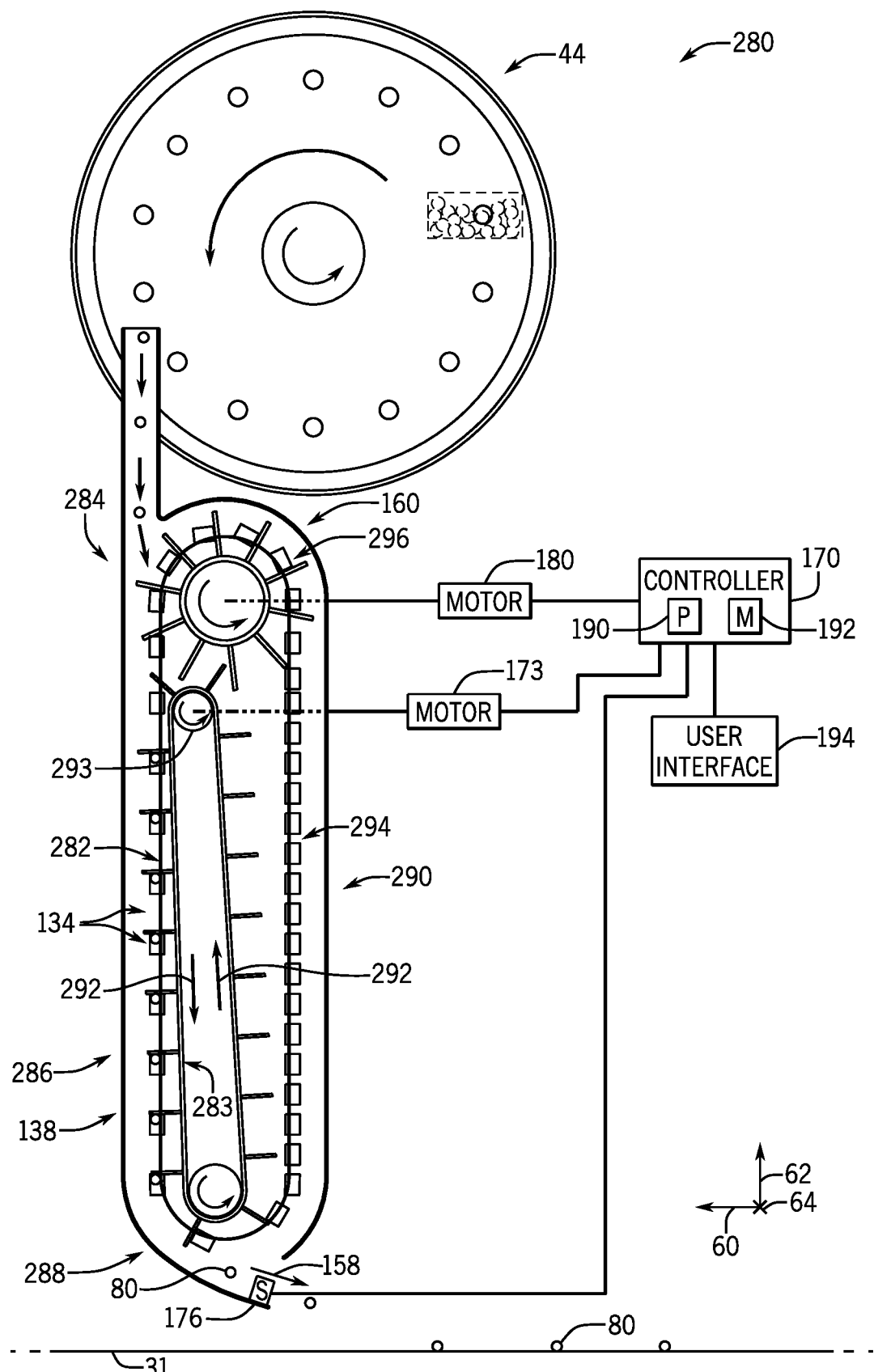
FIG. 8 is a side view of another embodiment of a particle delivery system that may be employed within the row unit of FIG. 2, in accordance with an aspect of the present disclosure.

FIG. 8 is a side view of another embodiment of a particle delivery system 280 that may be employed within the row unit of FIG. 2. The particle delivery system 280 includes the particle metering and singulation unit 44 configured to meter the particles 80 and the shuttles 134 configured to receive the particles 80. Additionally, the particle delivery system 280 includes a shuttle track 282 and a track belt 283 (e.g., an endless member) disposed within the shuttle track 282.

The shuttles 134 are configured to move along the shuttle track 282. The shuttle track 282 includes a particle reception section 284, a particle transfer section 286, a particle deposition section 288, and a shuttle queue section 290. At the particle reception section 284, the shuttles 134 receive the particles 80 from the particle metering and singulation unit 44. The track belt 283 is configured to rotate to move the shuttles 134 along the particle transfer section 286 from the particle reception section 284 to the particle deposition section 288. At the particle deposition section 288, the shuttles 134 release/deposit the particles 80 along the release trajectory 158 into the trench 31. The shuttles 134 queue at the shuttle queue section 290 prior to receiving the particles 80 at the particle reception section 284. The track belt 283 is configured to rotate, as indicated by arrows 292, to move shuttles 134 from the particle reception section 284, along the particle transfer section 286 and the particle deposition section 288, and to the shuttle queue section 290.

As illustrated, the particle reception section 284 and the shuttle queue section 290 overlap, such that each shuttle 134 is configured to receive a respective particle 80 at the particle reception section 284 while the shuttle 134 is queued in the shuttle queue section 290. The overlap of the particle reception section 284 and the shuttle queue section 290 enables the shuttles 134 to receive the particles 80 while traveling at a slower speed along the shuttle track 282 relative to other portions of the shuttle track 282, such as the particle transfer section 286 and/or the particle deposition section 288. In certain embodiments, the particle reception section 284 may overlap the particle transfer section 286. In some embodiments, the particle reception section 284 may not overlap the shuttle queue section 290, such that the shuttles 134 receive the particles 80 while not queued in/along the shuttle queue section 290.

Additionally, the controller 170 is configured to control a belt speed (e.g., rotation rate) of the track belt 283 to adjust/control the particle exit speed of the particles 80 at the particle deposition section 288 of the shuttle track 282, such that the particle exit speed reaches a target particle exit speed. For example, the controller 170 may control a wheel 293, via the second motor 173, configured to drive rotation of the wheel 293 and the track belt 283, (e.g., by outputting an output signal indicative of instructions to adjust the belt speed of the track belt 283 to the second motor 173) thereby adjusting/controlling the belt speed of the track belt 283 and a particle speed of the particles 80 within the shuttles 134.

As illustrated, the shuttle queue section 290 of the shuttle track 282 includes a first portion 294 and a second portion 296. Along the first portion 294, the shuttles 134 do not contact the track belt 283 or the track wheel assembly 160. The track belt 283 rotates to move the shuttles 134 from the particle deposition section 288 to the first portion 294 of the shuttle queue section 290. As each shuttle 134 moves into the first portion 294, the shuttle 134 is driven upwardly along the shuttle track 282 to the second portion 296 by the preceding shuttle(s) 134. At the second portion 296, the track wheel assembly 160 engages the shuttle 134 and moves the shuttle 134 through the second portion 296 of the shuttle queue section 290 to the particle reception section 284. As such, the shuttles 134 may be disengaged from the track wheel assembly 160 and the track belt 283 as the shuttles 134 move along the first portion 294 of the shuttle queue section 290.

Figure 9:
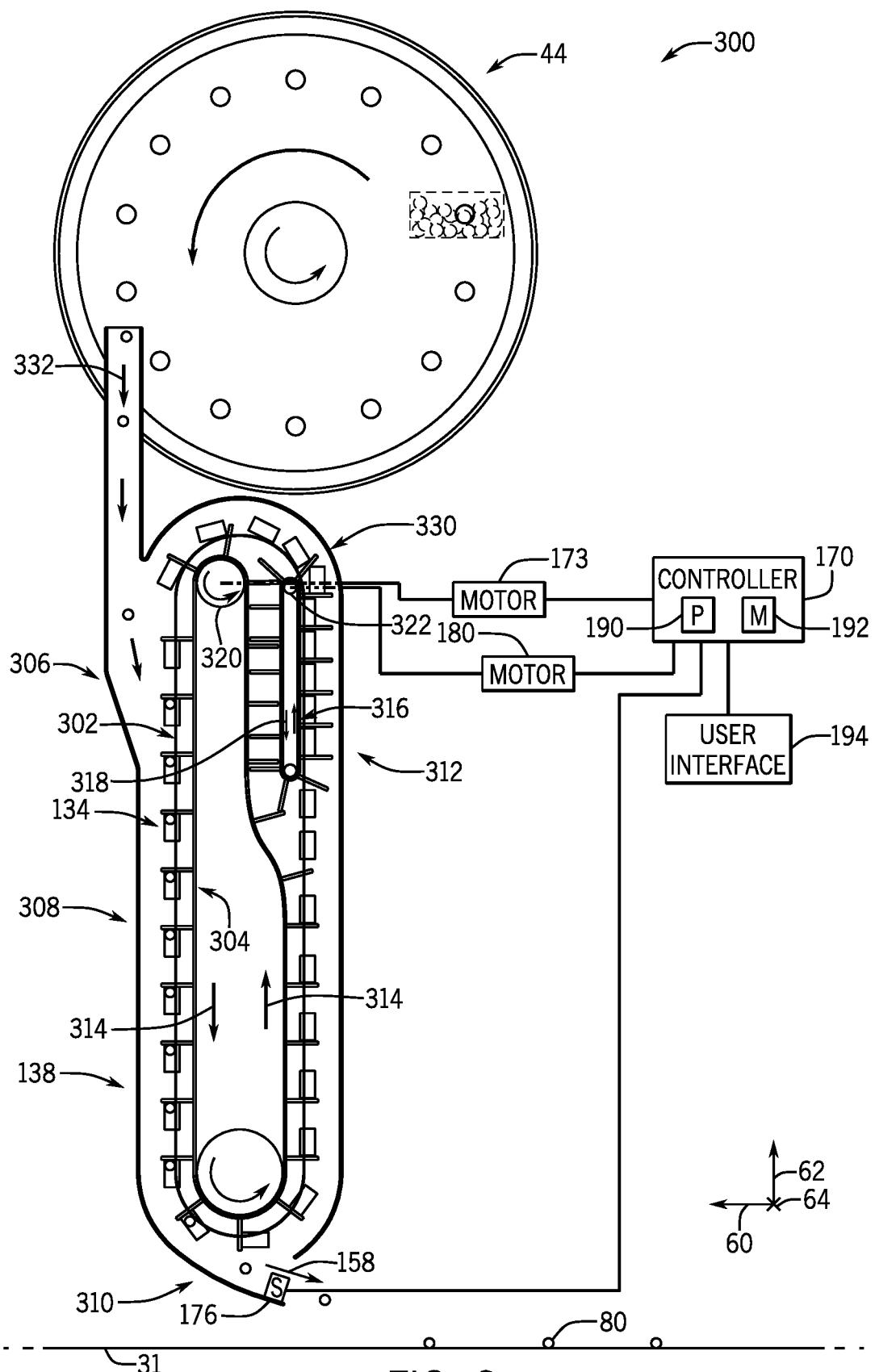
FIG. 9 is a side view of a further embodiment of a particle delivery system that may be employed within the row unit of FIG. 2, in accordance with an aspect of the present disclosure.

FIG. 9 is a side view of a further embodiment of a particle delivery system 300 that may be employed within the row unit of FIG. 2. The particle delivery system 300 includes the particle metering and singulation unit 44 configured to meter the particles 80 and the shuttles 134 configured to receive the particles 80. Additionally, the particle delivery system 300 includes a shuttle track 302 and a track belt 304 (e.g., an endless member) disposed within the shuttle track 302.

The shuttles 134 are configured to move along the shuttle track 302. The shuttle track 302 includes a particle reception section 306, a particle transfer section 308, a particle deposition section 310, and a shuttle queue section 312. At the particle reception section 306, the shuttles 134 receive the particles 80 from the particle metering and singulation unit 44. The track belt 304 is configured to rotate to move the shuttles 134 along the particle transfer section 308 from the particle reception section 306 to the particle deposition section 310. At the particle deposition section 310, the shuttles 134 release/deposit the particles 80 along the release trajectory 158 into the trench 31. The shuttles 134 queue at the shuttle queue section 312 prior to receiving the particles 80 at the particle reception section 306. The track belt 304 is configured to rotate, as indicated by arrows 314, to move shuttles 134 from the particle reception section 306, along the particle transfer section 308 and the particle deposition section 310, and to the shuttle queue section 312. Additionally, the particle delivery system 300 includes a queue belt 316 (e.g., a rotation mechanism) configured to rotate, as indicated by arrows 318, to move the shuttles 134 along the shuttle queue section 312.

Additionally, the controller 170 is configured to control a belt speed (e.g., rotation rate) of the track belt 304 to adjust/control the particle exit speed of the particles 80 at the particle deposition section 310 of the shuttle track 302, such that the particle exit speed reaches a target particle exit speed. For example, the controller 170 may control a first wheel 320, via the second motor 173, configured to drive rotation of the first wheel 320 and the track belt 304, (e.g., by outputting an output signal indicative of instructions to adjust the belt speed of the track belt 304 to the second motor 173) thereby adjusting/controlling the belt speed of the track belt 304 and a particle speed of the particles 80 within the shuttles 134.

In certain embodiments, the controller 170 may control a belt speed of the queue belt 316 to control movement of the shuttles 134 along the shuttle queue section 312 of the shuttle track 302. For example, the controller 170 may control a second wheel 322 of the particle delivery system 300, via the third motor 180, configured to drive rotation of the queue belt 316, (e.g., by outputting an output signal indicative of instructions to adjust the rotation rate of the second wheel 322 to the third motor 180) thereby adjusting/controlling the movement of the shuttles 134 along the shuttle queue section 312. In certain embodiments, the queue belt 316 and the second wheel 322 may be the rotation mechanism disposed along the shuttle queue section 312 and configured to move the shuttles 134 along the shuttle track 302 within the shuttle queue section 312 toward the particle reception section 306 of the shuttle track 302.

As illustrated, a top portion 330 of the shuttle track 302 includes the particle reception section 306, where the particles 80 are received by the shuttles 134. For example, the particles 80 may flow directly from the particle disc 82 of the particle metering and singulation unit 44 to the shuttles 134. Additionally, the direct flow of the particles 80 into the shuttles 134 may facilitate acceleration of the particles 80 via gravity. For example, the flow of the particles 80 along a transfer trajectory 332 from the particle disc 82 into the shuttles 134 may enable the particle delivery system 300 to accelerate the particles 80 via gravity (e.g., in addition to acceleration via the track belt 304).

Figure 10:
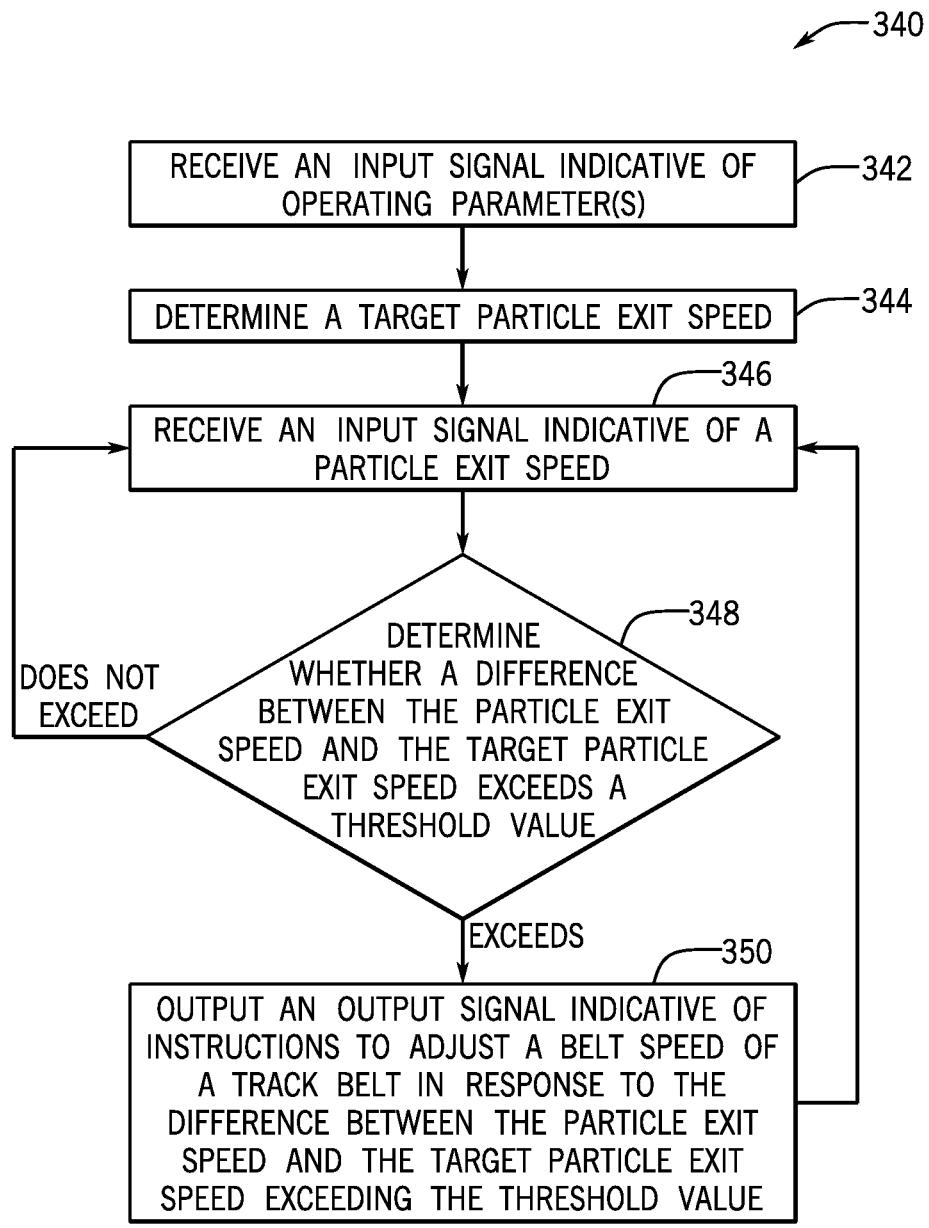
FIG. 10 is a flow diagram of an embodiment of a process for controlling a particle delivery system, in accordance with an aspect of the present disclosure.

FIG. 10 is a flow diagram of an embodiment of a process 340 for controlling a particle delivery system. For example, the process 340, or portions thereof, may be performed by the controller of the particle delivery system. The process 340 begins at block 342, in which an input signal indicative of operating parameter(s) is received. For example, the operating parameters may include the type of the particles, the ground speed of the row unit, the size of the particles, an amount of the shuttles, relative sizes of the particle disc and the shuttle track, or a combination thereof. The input signal may be received via the user interface communicatively coupled to the controller, may be stored in the memory of the controller, may be received via sensor(s) of the row unit and/or the agricultural implement, may be received from a transceiver, or a combination thereof.

At block 344, the target particle exit speed is determined. For example, the controller may determine the target particle exit speed of the particles based on the type of the particles, the ground speed of the row unit, the size of the particles, and/or other operating parameters. At block 346, an input signal indicative of the particle exit speed of the particle at the particle deposition section of the shuttle track is received. For example, the controller may receive the input signal indicative of the particle exit speed from the particle sensor disposed adjacent to the particle deposition section. In certain embodiments, the controller may receive multiple input signals from the particle sensor, in which each input signal is indicative of a particle exit speed of a respective particle. The controller may determine an average of the multiple particle exit speeds to determine the average particle exit speed of the particles at the particle deposition section. As such, the controller may account for variance among the particle exit speeds of multiple particles to reduce excessive control actions (e.g., adjustments to the belt speed of the track belt).

At block 348, a determination of whether a difference between the particle exit speed and the target particle exit speed exceeds a threshold value is made (e.g., by the controller). Additionally, a determination of whether the particle exit speed is less than or greater than the target particle exit speed is made (e.g., by the controller). The threshold value may be determined based on the type of the particles, the ground speed of the row unit, and/or other factors. In response to the difference exceeding the threshold, the process 340 proceeds to block 350. In response to the difference not exceeding the threshold, the process return to block 346 and receives the next input signal indicative of the particle exit speed.

At block 350, in response to the difference between the particle exit speed and the target particle exit speed exceeding the threshold value, an output signal indicative of instructions to adjust the belt speed of the track belt is output to the motor configured to drive rotation of the track belt (e.g., the motor configured to drive rotation of the wheel coupled to and configured to drive rotation of the track belt). For example, the controller may output the output signal indicative of instructions to increase the belt speed of the track belt in response to a determination that the particle exit speed is less than the target particle exit speed and the difference between the particle exit speed and the target particle exit speed exceeds the threshold value. Further, the controller may output the output signal indicative of instructions to decrease the belt speed of the track belt in response to a determination that the particle exit speed is greater than the target particle exit speed and the difference between the particle exit speed and the target particle exit speed exceeds the threshold value.

After completing block 350, the process 340 returns to block 346 and receives the next input signal indicative of the particle exit speed of the particle at the particle deposition section of the shuttle track. The next determination is made of whether the difference between the particle exit speed and the target particle exit speed exceeds the threshold value (e.g., block 348), and the belt speed of the track belt may be adjusted in response to the determination. As such, blocks 346-350 of the process 340 may be iteratively performed (e.g., by the controller of the particle delivery system and/or by another suitable controller) to facilitate acceleration of the particles to the target particle exit speed. In some embodiments, certain blocks of the blocks 342-350 may be omitted from the process 340 and/or the order of the blocks 342-350 may be different.

FIG. 10 is a perspective view of a particle delivery system 360 that may be employed within the row unit of FIG. 2. The particle delivery system 360 includes shuttles 362 configured to receive the particles 80 from the particle metering and singulation unit. Additionally, the particle delivery system 300 includes a shuttle track 364 and a track belt 366 (e.g., an endless member) disposed within the shuttle track 364.

The shuttle track 364 includes rails 368 coupled to a side panel 370 of a shuttle housing 372. As illustrated, the rails 368 and the side panel 370 are integrally formed as a single component (e.g., the shuttle housing 372 includes the rails 368). In certain embodiments, the rails and the side panel may be separate components coupled to one another. The shuttle housing may include an additional side panel and rails coupled to the side panel, such as a similar or the same structure as the illustrated side panel and rails, disposed generally of the illustrated side panel 370 and rails 368 relative to the track belt 366.

The shuttles 362 are configured to move along the shuttle track 364. For example, each shuttle 362 include wheels 380 disposed between and movably coupled to the rails 368. The track belt 366 includes paddles 382 configured to engage a lug coupled to the wheels 380 of each shuttle 362. The paddles 382 are coupled to a base 383 of the track belt 366. The track belt is configured to rotate, as indicated by arrows 384 to move the shuttles toward/along a particle deposition section 386 of the shuttle track 364.

Additionally, each shuttle 362 includes a particle holder 390 coupled (e.g., rigidly coupled) to the wheels 380 and configured to receive the particle 80 via an outward opening 392. The particle holder 390 includes side walls 394 that form the outward opening 392 and side openings 396. The shuttle 362 is configured to receive the particle 80 through the outward opening 392, such as at a particle reception section of the shuttle track 364, and to capture the particle 80 between the side walls 394 and the shuttle housing 372. The track belt 366 is configured to move the shuttles 362 having the particles 80 downwardly toward the particle deposition section 386 of the shuttle track 364. At the particle deposition section 386, the particles 80 are expelled from the shuttles 362 along a release trajectory 398 toward the trench 31 in soil, such as through the outward opening 392 and/or through one of the side openings 396.

FIG. 12 is a side view of the shuttle 362 engaged with the shuttle track 364. As described above, the track belt 366 is configured to rotate to move the shuttle 362 along the shuttle track 364 and to facilitate deposition of the particles 80 at the particle deposition section of the shuttle track 364. The paddles 382 of the track belt 366 are configured to engage (e.g., contact, push) a lug 400 of the shuttle 362 to move the shuttles 362 along the shuttle track 364. The lug 400 is coupled to and extends from a rib 402 of the shuttle 362. The rib 402 is coupled to the wheels 380 and the particle holder 390, such that movement of the lug 400 caused by the track belt 366 moves the particles 80 within the particle holder 390 toward the particle deposition section of the shuttle track 364. As illustrated, the lug 400 is disposed between opposing paddles 382 of the track belt 366, such that the shuttle 362 is configured to move between the opposing paddles 382 as the shuttle 362 moves along the shuttle track 364. For example, the shuttle 362 may move between the opposing paddles 382 to prevent jamming the track belt 366 as the track belt 366 rotates within the shuttle housing 372. In some embodiments, the lug 400 may be a pin, a rivet, or another suitable component coupled to the particle holder 390 and configured to engage the track belt 366 to drive movement of the particle holder 390.

Each shuttle 362 may be a single piece/component formed of molded plastic and/or die cast metal. In some embodiments, portions of the shuttle 362 (e.g., the wheels 380, the side walls 394, the lug 400, the rib 402, or a combination thereof) may be assembled to form the shuttle 362. In certain embodiments, the shuttles 362 or portions thereof, such as the wheels 380, may be formed of low-friction materials, such as nylon, Teflon, ultra-high molecular weight polyethylene (UHMW-PE), and/or other suitable materials configured to enable the shuttles 362 to move along the shuttle track 364. In some embodiments, the entire shuttle 362 may be a rigid (e.g., substantially rigid) component, such that the shuttle is not configured to flex. In certain embodiments, portion(s) of the shuttle 362 may be configured to flex, such as one or both side walls 394, to facilitate receipt, transportation, and deposition of the particles 80.

The embodiments of a particle delivery system described herein may facilitate deposition of particles into a trench in soil. The particle delivery system may be configured to accelerate the particles toward and along the trench and to provide a particular spacing between the particles along the trench. For example, the particle delivery system may include a particle metering and singulation unit configured to establish the particular spacing between particles. The particle metering and singulation unit may be configured to deliver the particles from a release point of the particle metering and singulation unit to shuttles configured to move along a shuttle track. For example, the shuttle track may be disposed adjacent to the particle metering and singulation unit. Each shuttle may receive a respective particle from the particle metering and singulation unit at a particle reception section of the shuttle track, move along the shuttle track, and release the particle toward the trench in the soil at a particle deposition section of the shuttle track. The particle delivery system may include the shuttles, the shuttle track, and a track belt disposed inwardly of the shuttle track. In certain embodiments, the shuttles, the shuttle track, and the track belt may form a shuttle assembly included in the particle delivery system.

The track belt may include paddles that extend outwardly and adjacent to the shuttle track. Each paddle may be configured to move a respective shuttle along the shuttle track from the particle reception section, to the particle deposition section, and to a shuttle queue section of the shuttle track. At the shuttle queue section, the shuttles may queue to receive the particles at the particle reception section. The track belt may rotate to move the shuttles along the shuttle track and to accelerate the particles disposed within the shuttles to a target particle exit speed at the particle deposition section of the shuttle track. For example, the track belt may accelerate the particles to a speed greater than a speed resulting from gravitational acceleration alone. As such, the particle delivery system may enable the row unit to travel faster than traditional row units that utilize seed tubes, which rely on gravity to accelerate the particles (e.g., seeds) for delivery to the soil.

Additionally, features of certain embodiments of the particle delivery systems described herein may be combined with features of other embodiments. For example, the track wheel assembly of FIGS. 3 and 8 may be included in the particle delivery system of FIG. 9. In certain embodiments, the particle tube of FIGS. 3 and 4 may be included in the particle delivery systems of FIGS. 8, 9, and 11. In some embodiments, the particle tube of FIGS. 3, 4, 8, and 9 may be omitted from the respective particle delivery systems. In certain embodiments, the air flow system of FIG. 3 may be included in the particle delivery systems of FIGS. 8, 9, and 11. In some embodiments, the wheel of FIG. 3 configured to facilitate rotation of the track belt and disposed adjacent to the particle deposition section of the shuttle track may be included in the particle delivery systems of FIGS. 6-11. In certain embodiments, the queue belt of FIG. 9 and/or the wheel configured to drive rotation of the queue belt of FIG. 9 may be included in the particle delivery systems of FIGS. 3, 8, and 11. In some embodiments, the track belt of FIG. 3 may be included in the particle delivery systems of FIGS. 8, 9, and 11. In certain embodiments, the track belt of FIG. 8 may be included in the particle delivery systems of FIGS. 3, 9, and 11. In some embodiments, the track belt of FIG. 9 may be included in the particle delivery systems of FIGS. 3, 8, and 11. In certain embodiments, the shuttles, the shuttle track, the shuttle housing, or portion(s) thereof, may be includes the particle delivery systems of FIGS. 3, 8, and 9. Additionally or alternatively, the embodiments of the particle delivery systems described herein, or portions thereof, may be combined in other suitable manners.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A particle delivery system of an agricultural row unit, comprising:
a shuttle track configured to be disposed adjacent to a particle metering and singulation unit;
a plurality of shuttles movably disposed along the shuttle track, wherein each shuttle of the plurality of shuttles is configured to:
receive a particle from the particle metering and singulation unit at a particle reception section of the shuttle track; and
release the particle toward a trench in soil at a particle deposition section of the shuttle track; and
a track belt disposed inwardly of the shuttle track, wherein the track belt comprises a plurality of paddles detachable from the track belt, such that a spacing between the plurality of paddles is adjustable, and each paddle of the plurality of paddles is configured to move a respective shuttle of the plurality of shuttles along a particle transfer section of the shuttle track from the particle reception section to the particle deposition section.

2. The particle delivery system of claim 1, wherein the shuttle track comprises a shuttle queue section that enables one or more shuttles of the plurality of shuttles to queue prior to receiving the particle from the particle metering and singulation unit.

3. The particle delivery system of claim 2, comprising a rotation mechanism disposed along the shuttle queue section and configured to move the one or more shuttles along the shuttle track within the shuttle queue section.

4. The particle delivery system of claim 3, wherein the shuttle queue section of the shuttle track overlaps the particle reception section of the shuttle track, such that each shuttle of the plurality of shuttles is configured to receive the particle at the particle reception section while the shuttle is queued in the shuttle queue section.

5. The particle delivery system of claim 1, wherein the track belt is configured to accelerate the particle to a target particle exit speed at the particle deposition section of the shuttle track.

6. The particle delivery system of claim 1, wherein the particle deposition section of the shuttle track is disposed at a curved section of the shuttle track, and the curved section of the shuttle track is configured to cause the particle to accelerate outwardly away from the shuttle track and toward the trench as the shuttle moves along the curved section of the shuttle track.

7. The particle delivery system of claim 1, wherein the shuttle track comprises two rails, and each shuttle of the plurality of shuttles is movably coupled to each rail of the two rails.

8. The particle delivery system of claim 7, comprising a shuttle housing, wherein each rail of the two rails is integrally formed with the shuttle housing.

9. The particle delivery system of claim 8, wherein each shuttle of the plurality of shuttles is configured to capture the particle between the shuttle and the shuttle housing as the shuttle moves along the particle transfer section of the shuttle track between the particle reception section and the particle deposition section.

10. A particle delivery system of an agricultural row unit, comprising:
a particle metering and singulation unit configured to meter a plurality of particles from a particle storage area toward a shuttle track;
the shuttle track disposed adjacent to the particle metering and singulation unit;
a plurality of shuttles movably disposed along the shuttle track, wherein each shuttle of the plurality of shuttles is configured to:

receive a respective particle of the plurality of particles from the particle metering and singulation unit at a particle reception section of the shuttle track; and release the respective particle toward a trench in soil at a particle deposition section of the shuttle track; and a track belt disposed inward of the shuttle track, wherein the track belt comprises a plurality of paddles detachable from the track belt, such that a spacing between the plurality of paddles is adjustable, and each paddle of the plurality of paddles is configured to move a respective shuttle of the plurality of shuttles along a particle transfer section of the shuttle track between the particle reception section to the particle deposition section.

11. The particle delivery system of claim 10, comprising a shuttle housing, wherein the shuttle track, the plurality of shuttles, and the track belt are disposed within the shuttle housing.

12. The particle delivery system of claim 11, wherein each shuttle of the plurality of shuttles is configured to capture the respective particle between the shuttle and the shuttle housing as the shuttle moves along the particle transfer section of the shuttle track between the particle reception section and the particle deposition section.

13. The particle delivery system of claim 11, wherein the shuttle housing comprises:
   a particle reception aperture adjacent to the particle reception section of the shuttle track; and
   a particle deposition aperture adjacent to the particle deposition section of the shuttle track.

14. The particle delivery system of claim 13, wherein the particle metering and singulation unit comprises a particle disc configured to transfer the respective particle from the particle storage area to a release point, and the particle metering and singulation unit is configured to release the respective particle at the release point, such that the respective particle flows through the particle reception aperture and toward the particle reception section of the shuttle track.

15. The particle delivery system of claim 10, comprising a particle tube configured to at least partially direct the respective particle from the particle metering and singulation unit to the shuttle track.

16. A particle delivery system of an agricultural row unit, comprising:
   a shuttle track configured to be disposed adjacent to a particle metering and singulation unit;
   a plurality of shuttles movably disposed along the shuttle track, wherein each shuttle of the plurality of shuttles is configured to:
      receive a particle from the particle metering and singulation unit at a particle reception section of the shuttle track; and
      release the particle toward a trench in soil at a particle deposition section of the shuttle track; and
   a track belt disposed inward of the shuttle track, wherein the track belt comprises a plurality of paddles, and each paddle of the plurality of paddles is configured to move a respective shuttle of the plurality of shuttles along a particle transfer section of the shuttle track between the particle reception section to the particle deposition section; and
   a controller comprising a memory and a processor, wherein the controller is configured to:
      receive an input signal indicative of a particle exit speed of the particle at the particle deposition section of the shuttle track; and
      output an output signal indicative of instructions to adjust a belt speed of the track belt, such that a difference between the particle exit speed and a target particle exit speed is less than a threshold value.

17. The particle delivery system of claim 16, comprising:
a wheel configured to drive rotation of the track belt; and
a motor configured to drive rotation of the wheel, wherein the motor is communicatively coupled to the controller.

18. The particle delivery system of claim 17, wherein the controller is configured to output the output signal to the motor indicative of instructions to increase the belt speed of the track belt in response to determining that the particle exit speed is less than the target particle exit speed and the difference between the particle exit speed and the target particle exit speed exceeds the threshold value, and the output signal causes the motor to increase a rotational speed of the wheel.

19. The particle delivery system of claim 17, wherein the controller is configured to output the output signal to the motor indicative of instructions to decrease the belt speed of the track belt in response to determining that the particle exit speed is greater than the target particle exit speed and the difference between the particle exit speed and the target particle exit speed exceeds the threshold value, and the output signal causes the motor to decrease a rotational speed of the wheel.

20. The particle delivery system of claim 16, wherein each shuttle of the plurality of shuttles is configured to release the particle along a release trajectory extending within a release angle of the trench, and the release angle is between five degrees and thirty-five degrees.

\* \* \* \* \*